US009213188B2

(12) United States Patent
Yang

(10) Patent No.: US 9,213,188 B2
(45) Date of Patent: Dec. 15, 2015

(54) DISPLAY APPARATUS AND OPTICAL MEMBER

(71) Applicant: Japan Display Inc., Tokyo (JP)

(72) Inventor: Yingbao Yang, Tokyo (JP)

(73) Assignee: Japan Display Inc., Tokyo (JP)

( * ) Notice: Subject to any disclaimer, the term of this patent is extended or adjusted under 35 U.S.C. 154(b) by 49 days.

(21) Appl. No.: 14/086,138

(22) Filed: Nov. 21, 2013

(65) Prior Publication Data
US 2014/0184960 A1    Jul. 3, 2014

(30) Foreign Application Priority Data

Dec. 28, 2012    (JP) .................................. 2012-288599

(51) Int. Cl.
*G02F 1/1335*    (2006.01)
*G02B 27/22*    (2006.01)

(52) U.S. Cl.
CPC ................................. *G02B 27/2214* (2013.01)

(58) Field of Classification Search
CPC .................................................. G02B 27/2214
USPC ........................................................... 349/15
See application file for complete search history.

(56) References Cited

U.S. PATENT DOCUMENTS

| 6,049,424 A | 4/2000 | Hamagishi |
| 2007/0165305 A1* | 7/2007 | Mehrle ........................ 359/464 |
| 2013/0342586 A1* | 12/2013 | Kim et al. ..................... 345/690 |

FOREIGN PATENT DOCUMENTS

| JP | H09-197344 A | 7/1997 |
| JP | 2002-318369 A | 10/2002 |
| JP | 2007-187823 A | 7/2007 |
| JP | 2012-68500 | 4/2012 |

OTHER PUBLICATIONS

Japanese Office Action issued Apr. 14, 2015 for corresponding Japanese Application No. 2012-288599.

* cited by examiner

*Primary Examiner* — Thanh-Nhan P Nguyen
(74) *Attorney, Agent, or Firm* — Michael Best & Friedrich LLP

(57) ABSTRACT

A naked-eye type display apparatus which makes a viewer recognize a stereoscopic image and can prevent pseudoscopic perception is provided. A barrier part having a function of separating a left eye image and a right eye image from each other at a normal viewing position at which the left eye image enters a left eye and the right eye image enters a right eye is provided, and a barrier part having a function of blocking entrance of the left eye image into the right eye or entrance of the right eye image into the left eye when a viewer is at a pseudoscopic position is provided. In this manner, even when the viewer is at the pseudoscopic position, the pseudoscopic perception can be prevented.

13 Claims, 19 Drawing Sheets

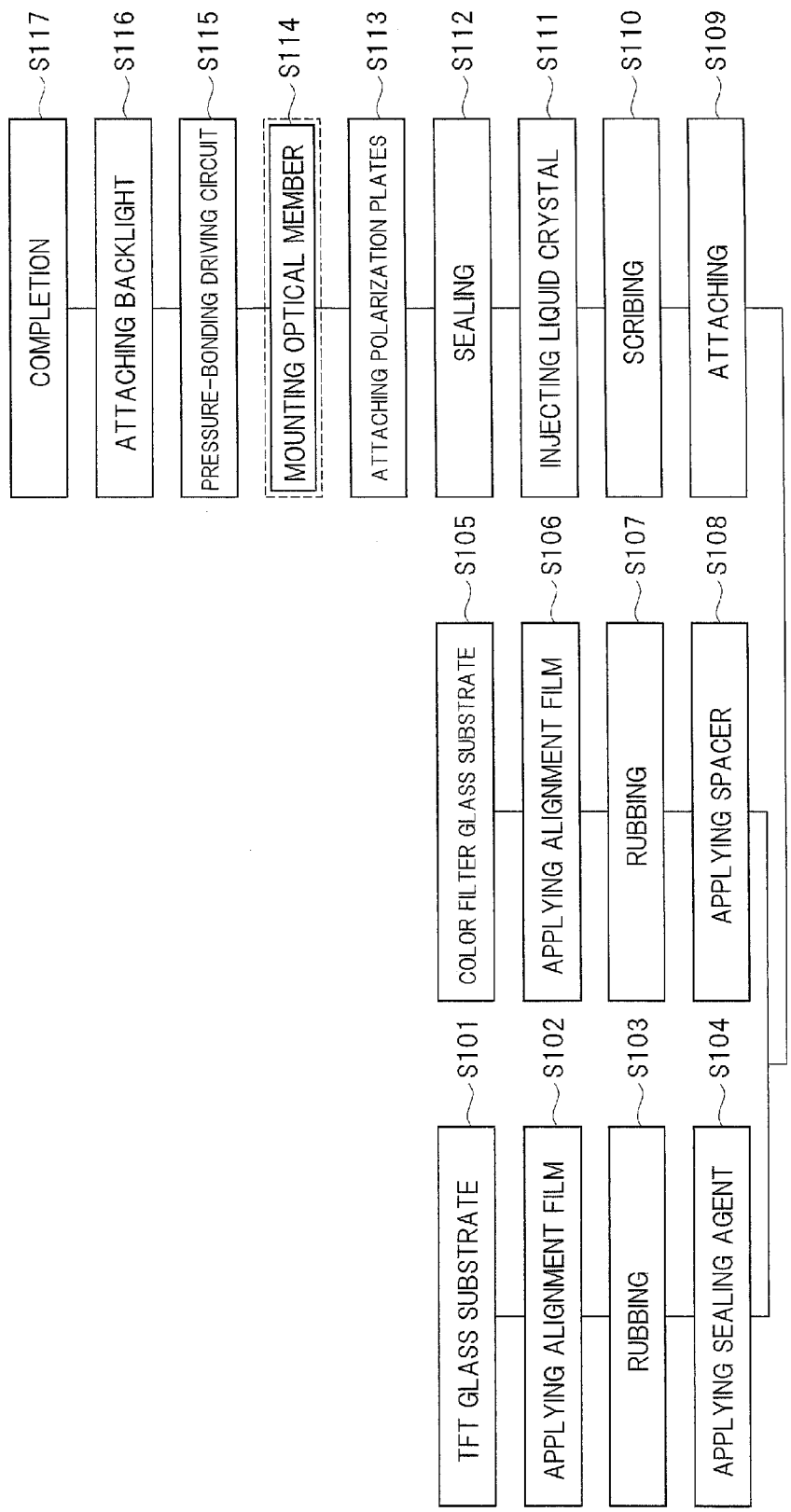

DISPLAY APPARATUS AND OPTICAL MEMBER

CROSS-REFERENCE TO RELATED APPLICATION

The present application claims priority from Japanese Patent Application No. 2012-288599 filed on Dec. 28, 2012, the content of which is hereby incorporated by reference into this application.

TECHNICAL FIELD OF THE INVENTION

The present invention relates to a display apparatus and an optical member.

BACKGROUND OF THE INVENTION

In recent years, display apparatuses which can make a viewer recognize a stereoscopic image have become more and more popular. For example, Japanese Patent Application Laid-Open Publication No. 2012-68500 describes a display apparatus in which a lenticular lens is disposed on a display unit so that a stereoscopic image can be seen with the naked eye.

SUMMARY OF THE INVENTION

In a display apparatus which makes a viewer recognize a stereoscopic image with the naked eye, different images are displayed as an image for left eye (left eye image) and an image for right eye (right eye image). The display apparatus is configured so that the left eye image enters the left eye of the viewer and the right eye image enters the right eye of the viewer. As a result, the viewer can recognize a stereoscopic image by synthesizing the left eye image which has entered the left eye and the right eye image which has entered the right eye in the brain.

As a display apparatus which makes a viewer recognize a stereoscopic image like this, there are a glasses-wearing type display apparatus on which a viewer wears glasses for stereoscopic image viewing to recognize a stereoscopic image and a naked-eye type display apparatus on which a stereoscopic image is recognized with the naked eye of a viewer. The naked-eye type has such an advantage that a viewer can get away from the bother of wearing exclusive glasses as compared with the glasses-wearing type. For example, as the naked-eye type having such an advantage, there are a parallax barrier system which utilizes a slit to separate a left eye image and a right eye image, a lenticular system which utilizes a lenticular lens to separate a left eye image and a right eye image, and the like. The parallax barrier system and the lenticular system are different from each other in such a point that the former utilizes the slit which is a clearance and the latter utilizes the lenticular lens, but since they have a common basic configuration other than this difference, the display apparatus which makes a viewer recognize a stereoscopic image will be described below while mainly taking the parallax barrier system which is one of the systems used for the naked-eye type display apparatus as an example.

FIG. 1 is a schematic diagram showing a configuration of a display apparatus adopting a general parallax barrier system. As shown in FIG. 1, a display unit DU displaying an image is provided with a plurality of pixels. Specifically, the display unit DU has a plurality of pixels L1 for displaying a left eye image and a plurality of pixels R1 for displaying a right eye image. The plurality of pixels L1 are configured to display the left eye image, and the plurality of pixels R1 are configured to display the right eye image. Here, the plurality of pixels L1 and the plurality of pixels R1 are alternately disposed in a predetermined direction, for example, in a direction shown as a lateral direction on a plane of paper in FIG. 1. Also, the plurality of pixels L1 and the plurality of pixels R1 are configured so that image lights are emitted upward from the display unit DU.

Next, a barrier part FB is formed on the display unit DU thus configured. In other words, the barrier part FB is provided on a light-emitting side from which image light from the display unit DU is emitted. As shown in FIG. 1, the barrier part FB is configured to have a base material 1S composed of a transparent member such as glass, transparent plastic, or transparent film and a plurality of light-blocking portions 2 formed on a surface of the base material 1S. Each of the plurality of light-blocking portions 2 has a function of blocking visible light and they are cyclically disposed in the above-described predetermined direction. Also, a protection member 3 composed of, for example, a transparent member is disposed on the barrier part FE thus configured. Image light emitted from the display unit DU is emitted to the outside through transmission portions 5 which are regions of the barrier part FB where the light-blocking portions 2 are not disposed.

The display apparatus of the general parallax barrier system is configured as described above, and a display operation in the display apparatus of the parallax barrier system will be described below with reference to FIG. 1. In FIG. 1, a left eye image is displayed by the plurality of pixels L1, and some of image lights emitted from the plurality of pixels L1 enter the left eye LE of a viewer. On the other hand, a right eye image is displayed by the plurality of pixels R1 and some of image lights emitted from the plurality of pixels R1 enter the right eye RE of the viewer. On the other hand, image lights emitted toward the right eye RE among image lights emitted from the plurality of pixels L1 are blocked by the light-blocking portions 2 of the barrier part FB to be prevented from entering the right eye RE of the viewer. Similarly, image lights emitted toward the left eye LE among image lights emitted from the plurality of pixels R1 are blocked by the light-blocking portions 2 of the barrier part FB to be prevented from entering the left eye LE of the viewer.

As a result, at the position of the viewer shown in FIG. 1, only the left eye image enters the left eye LE of the viewer, and only the right eye image enters the right eye RE of the viewer. More specifically, by the barrier part FB having the configuration where the light-blocking portions 2 are cyclically disposed, the left eye image and the right eye image displayed on the display unit DU are separated from each other. Thus, the viewer can recognize a stereoscopic image by synthesizing the left eye image which has entered the left eye LE and the right eye image which has entered the right eye RE in the brain.

At the position of the viewer shown in FIG. 1, the viewer can recognize a stereoscopic image. This position is defined as "normal viewing position" in this specification. More specifically, the normal viewing position mentioned in this specification indicates a position where a left eye image is caused to enter the left eye LE and a right eye image is caused to enter the right eye RE.

In this manner, the viewer can recognize the stereoscopic image on the display apparatus of the parallax barrier system.

However, in the display apparatus of the parallax barrier system, the problem described below occurs when the position of the viewer deviates from the normal viewing position.

FIG. 2 is a diagram for describing the case where the position of the viewer has deviated from the normal viewing position in the display apparatus of the parallax barrier system. FIG. 2 shows a case where the position of the viewer has deviated from the normal viewing position shown in FIG. 1 in a right direction. As shown in FIG. 2, when the position of the viewer has deviated from the normal viewing position, some of image lights emitted from the plurality of pixels L1 on which the left eye image is displayed enter the right eye RE of the viewer. On the other hand, some image lights emitted from the plurality of pixels R1 on which the right eye image is displayed enter the left eye LE of the viewer. Also, image lights emitted toward the left eye LE among the image lights emitted from the plurality of pixels L1 are blocked by the light-blocking portions 2 of the barrier part FB and do not enter the left eye LE of the viewer. Similarly, image lights emitted toward the right eye RE among the image lights emitted from the plurality of pixels R1 are blocked by the light-blocking portions 2 of the barrier part FB and do not enter the right eye RE of the viewer.

In this specification, the position where the right eye image enters the left eye LE and the left eye image enters the right eye RE shown in FIG. 2 is defined as "pseudoscopic position". Also, in this specification, the phenomenon where the right eye image enters the left eye LE of the viewer and the left eye image enters the right eye RE of the viewer is defined as "pseudoscopic perception".

As described above, when the viewer watches the left eye image and the right eye image displayed on the display unit DU at the pseudoscopic position, the right eye image enters the left eye LE of the viewer and the left eye image enters the right eye RE of the viewer by the barrier part FB having the configuration where the light-blocking portions 2 are cyclically disposed. More specifically, there is a possibility that the pseudoscopic perception occurs.

In view of these circumstances, an object of the present invention is to prevent the pseudoscopic perception from occurring in the naked-eye type display apparatus which makes a viewer recognize a stereoscopic image.

Another object of the present invention is to provide a naked-eye type display apparatus capable of recognizing a stereoscopic image and preventing the pseudoscopic perception.

A display apparatus according to one embodiment includes: a display unit which displays a left eye image and a right eye image; a first barrier part which separates the left eye image and the right eye image from each other at a normal viewing position at which the left eye image enters a left eye and the right eye image enters a right eye; and a second barrier part which blocks entrance of the left eye image into the right eye or entrance of the right eye image into the left eye.

The first barrier part separates a left eye image and a right eye image which are displayed on the display unit DU from each other. Thus, it is possible to make a viewer recognize a stereoscopic image by synchronizing the left eye image which has entered the left eye and the right eye image which has entered the right eye in the brain.

The second barrier part prevents the right eye image from entering the left eye and prevents the left eye image from entering the right eye, thereby preventing pseudoscopic perception, when the viewer is at the pseudoscopic position deviated from the normal viewing position.

In this manner, in the display apparatus according to an embodiment, since entrance of the left eye image into the right eye RE or entrance of the right eye image into the left eye LE can be blocked even when the viewer is at the pseudoscopic position, the pseudoscopic perception can be prevented.

Also, an optical member according to one embodiment is an optical member mounted on a display apparatus having a display unit which displays a left eye image and a right eye image, and the optical member includes: a first barrier part which separates the left eye image and the right eye image from each other at a normal viewing position at which the left eye image enters a left eye and the right eye image enters a right eye; and a second barrier part which blocks entrance of the left eye image into the right eye or entrance of the right eye image into the left eye.

According to an aspect of the invention disclosed here, the pseudoscopic perception can be prevented from occurring in the naked-eye type display apparatus which makes a viewer recognize a stereoscopic image.

According to an aspect of the invention disclosed here, it is possible to provide a naked-eye type display apparatus capable of recognizing a stereoscopic image and preventing the pseudoscopic perception.

BRIEF DESCRIPTIONS OF THE DRAWINGS

FIG. 26 is a flowchart showing a flow of manufacturing steps for manufacturing the display apparatus in the second embodiment.

DESCRIPTIONS OF THE PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle.

Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Also, components having the same function are denoted by the same reference symbols throughout the drawings for describing the embodiments, and the repetitive description thereof is omitted. Note that hatching is used even in a plan view so as to make the drawings easy to see.

(First Embodiment)
<Configuration of Display Apparatus in First Embodiment>

Figure 1:
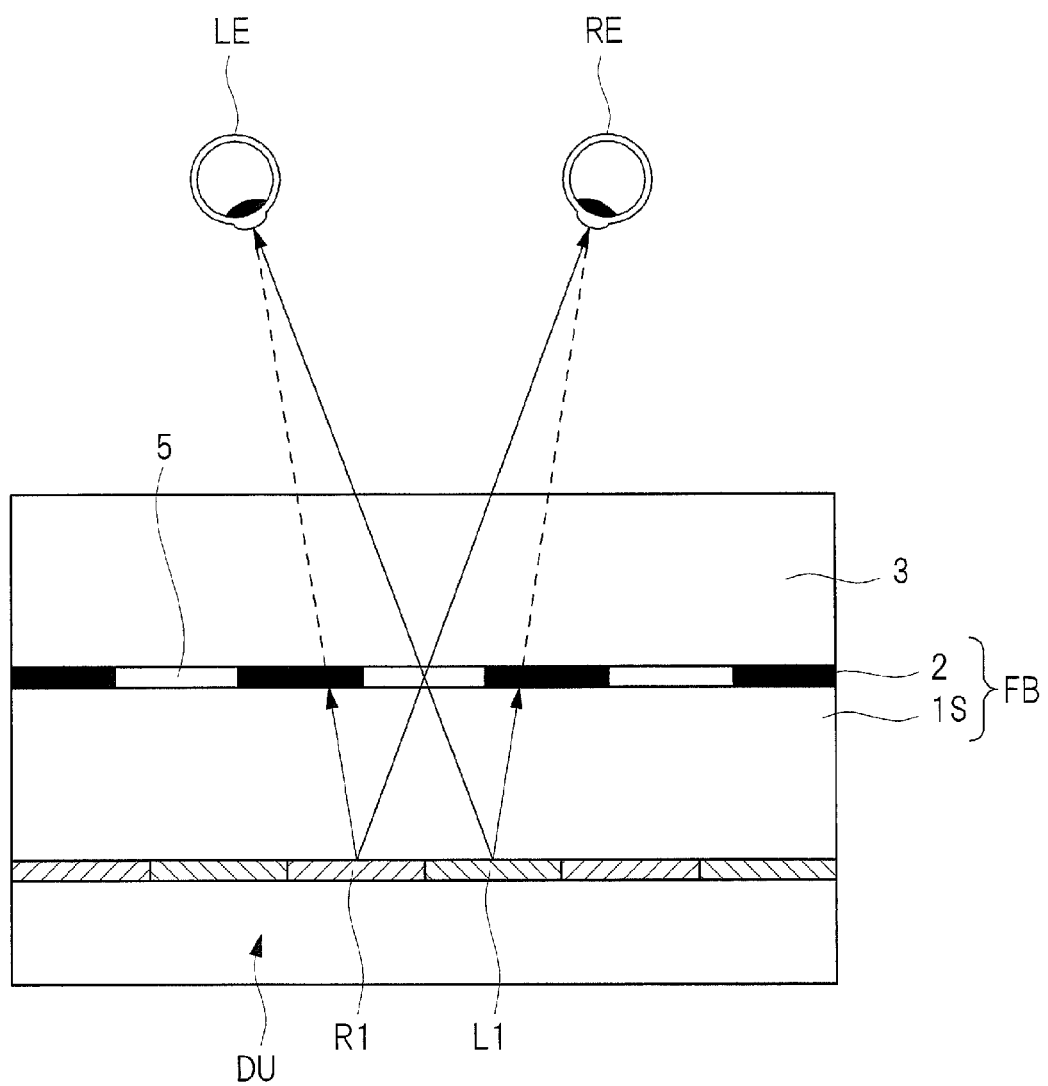
FIG. 1 is a schematic diagram showing a configuration of a display apparatus adopting a parallax barrier system.
Figure 2:
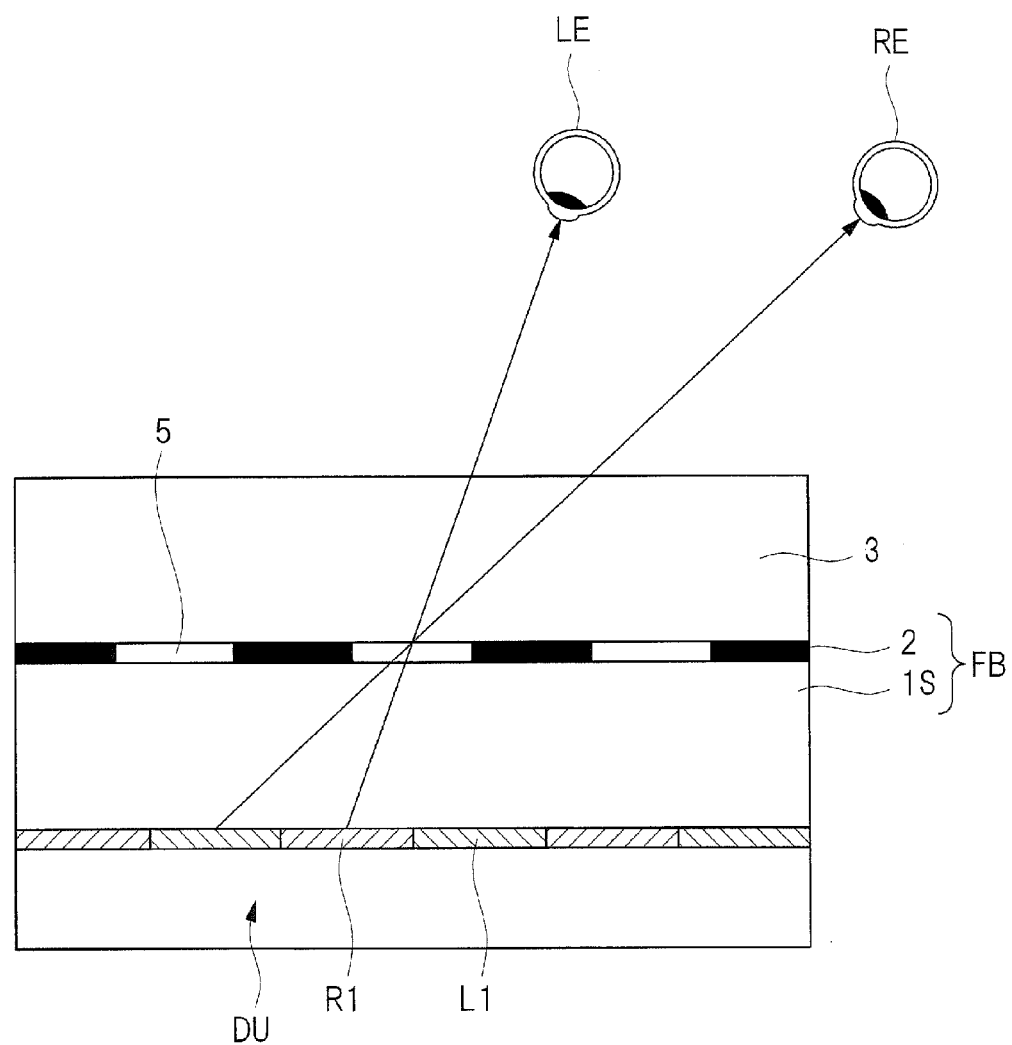
FIG. 2 is a diagram for describing the case where a position of a viewer has deviated from a normal viewing position in the display apparatus of the parallax barrier system.
Figure 3:
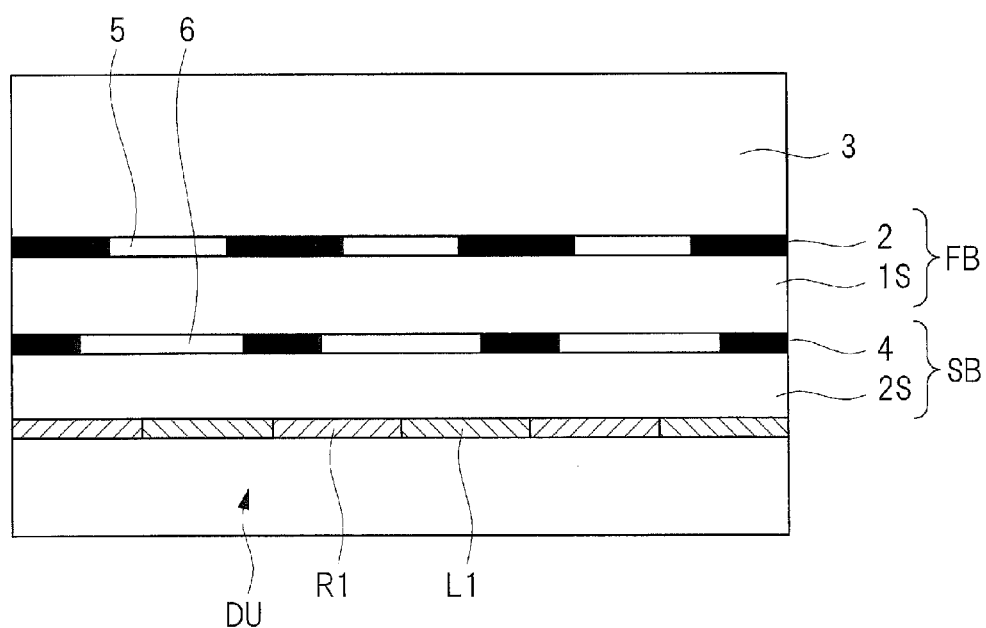
FIG. 3 is a sectional view showing an illustrative configuration of a display apparatus in a first embodiment.

FIG. 3 is a sectional view showing an illustrative configuration of a display apparatus in a first embodiment. In FIG. 3, the display apparatus in the first embodiment has a display unit DU which displays a left eye image and a right eye image. The display unit DU is provided with a plurality of pixels. Specifically, the display unit DU has a plurality of pixels L1 for displaying a left eye image and a plurality of pixels R1 for displaying a right eye image. The plurality of pixels L1 are configured to display the left eye image, and the plurality of pixels R1 are configured to display the right eye image. Here, the plurality of pixels L1 and the plurality of pixels R1 are alternately disposed in a predetermined direction, for example, in a lateral direction on a plane of paper in FIG. 1. Also, image lights are emitted from the plurality of pixels L1 and the plurality of pixels R1 upward from the display unit DU.

The display unit DU thus configured can be composed of, for example, either one of a liquid crystal display panel, an organic EL (Electro Luminescence) display panel, and a plasma display panel.

The liquid crystal display panel has a structure in which liquid crystal is sandwiched from both sides thereof by a pixel electrode and a counter electrode, and an alignment direction of the liquid crystal is controlled by applying a voltage between the pixel electrode and the counter electrode. Also, in the liquid crystal display panel, transmission and blocking of light from a backlight is controlled by controlling the alignment direction of the liquid crystal, thereby reproducing an image expressed by the contrast of light.

Further, the organic EL display panel has a structure in which an organic EL layer is sandwiched from both sides thereof by a cathode and an anode, and a voltage is applied to the cathode and the anode, thereby injecting electrons and holes into the organic EL layer. In the organic EL display panel, electrons and holes injected into the organic EL layer are recombined to each other, electron energy of organic molecules constituting the organic EL layer makes transition from a ground state to an excited state by the energy from this recombination, and light is then emitted when the electron energy of the organic molecules returns to the ground state from the excited state. The display panel utilizing this phenomenon is the organic EL display panel. Note that the organic EL layer includes required ones of a light-emitting layer, a carrier injection layer, a carrier transport layer, and the like.

Furthermore, the plasma display panel has a structure in which opposed electrodes are disposed in a sealed pixel space and gas is filled in the pixel space, and discharging is caused by applying a voltage between the opposed electrodes. In the plasma display panel, gas is changed to a plasma state by the energy of the discharging, and visible light is generated by irradiating a fluorescent substance applied to the inside of the pixel space with ultraviolet rays generated when the gas in the plasma state returns to the original gas state. The display panel utilizing this phenomenon is the plasma display panel.

Next, as shown in FIG. 3, in the display apparatus in the first embodiment, a barrier part SB is formed on the display unit DU. In other words, the barrier part SB is provided on the light-emitting side of the display unit DU from which image light is emitted. As shown in FIG. 3, the barrier part SB is configured to have a base material 2S composed of a transparent member such as glass, transparent plastic, or transparent film and a plurality of light-blocking portions 4 formed on a surface of the base material 2S. Each of the plurality of light-blocking portions 4 has a function of blocking visible light and they are cyclically disposed in the above-described predetermined direction. Image light emitted from the display unit DU is emitted to the outside through transmission portions 6 which are regions of the barrier part SB where the light-blocking portions 4 are not disposed.

Specifically, each of the plurality of light-blocking portions 4 is composed of a light-blocking film, and the light-blocking film is made of, for example, a metal film or a resin film. As the metal film, for example, a film containing at least one of chromium (Cr), aluminum (Al), and molybdenum (Mo) can be used. More specifically, the metal film may be made of an alloy containing at least two of chromium (Cr), aluminum (Al), and molybdenum (Mo). Further, the metal film may be a stacked film of at least two of a chromium (Cr) layer, an aluminum (Al) layer, and a molybdenum (Mo) layer.

Subsequently, as shown in FIG. 3, in the display apparatus in the first embodiment, another barrier part FB is formed on the barrier part SB. As shown in FIG. 3, the barrier part FB is configured to have a base material 1S composed of a transparent member such as glass, transparent plastic, or transparent film and a plurality of light-blocking portions 2 formed on a surface of the base material 1S. Each of the plurality of light-blocking portions 2 has a function of blocking visible light and they are cyclically disposed in the above-described predetermined direction. Image light emitted from the display unit DU is emitted to the outside through transmission portions 5 which are regions of the barrier part FE where the light-blocking portions 2 are not disposed.

Specifically, each of the plurality of light-blocking portions 2 is also composed of a light-blocking film, and the light-blocking film is made of, for example, a metal film or a resin film. As the metal film, for example, a film containing at least one of chromium (Cr), aluminum (Al), and molybdenum (Mo) can be used. More specifically, the metal film may be made of an alloy containing at least two of chromium (Cr), aluminum (Al), and molybdenum (Mo). Further, the metal film may be a stacked film of at least two of a chromium (Cr) layer, an aluminum (Al) layer, and a molybdenum (Mo) layer.

A protection member 3 composed of, for example, a transparent member is disposed on the barrier part FB thus configured.

<Display Operation of Display Apparatus in First Embodiment>

The display apparatus in the first embodiment is configured in the above-described manner, and a display operation thereof will be described below with reference to the drawings.

Figure 4:
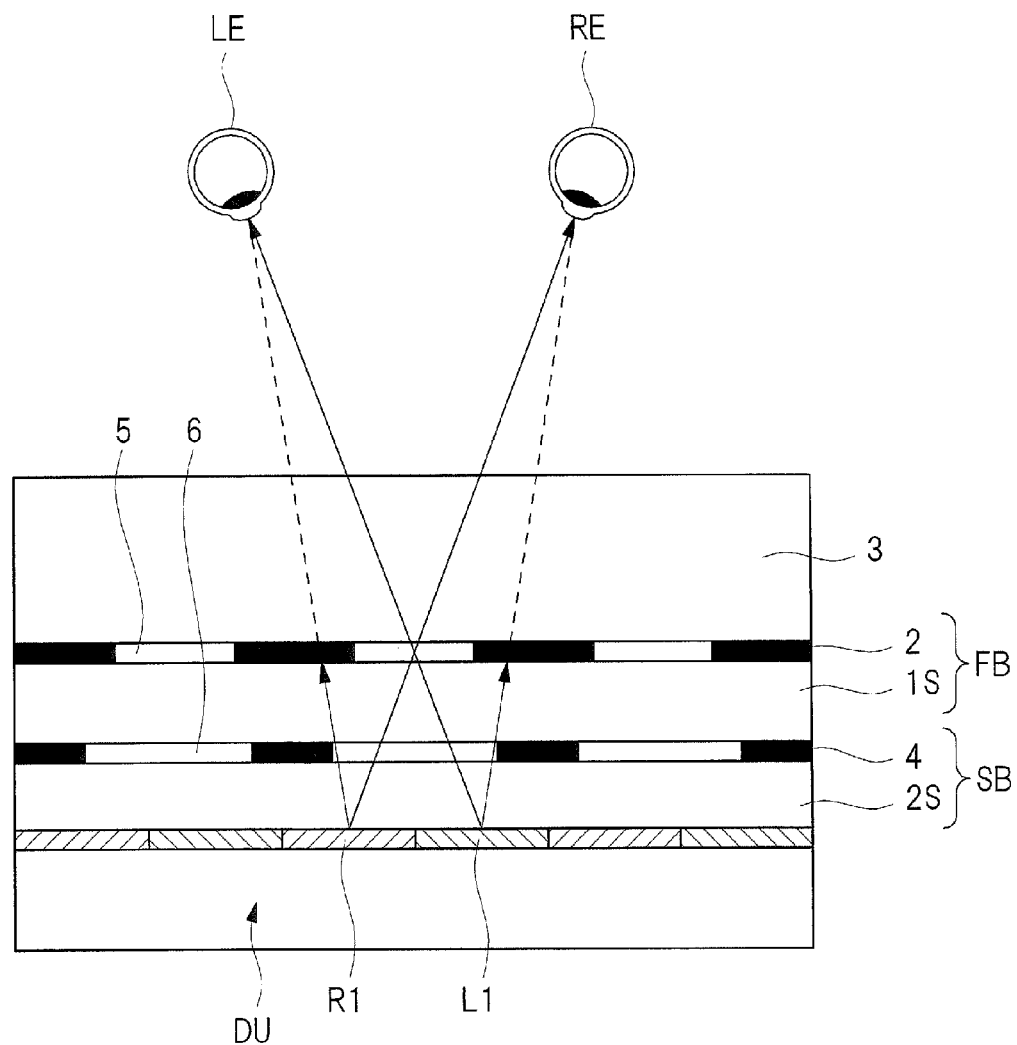
FIG. 4 is a diagram for describing a display operation when a viewer is at a normal viewing position.

First, a case where a viewer is at a normal viewing position will be described. FIG. 4 is a diagram for describing a display operation when a viewer is at a normal viewing position. In FIG. 4, in the display apparatus in the first embodiment, a left eye image is displayed by the plurality of pixels L1, and some of image lights emitted from the plurality of pixels L1 pass through the transmission portions 6 of the barrier part SB where the light-blocking portions 4 are not disposed and subsequently pass through the transmission portions 5 of the barrier part FB where the light-blocking portions 2 are not disposed, thereby entering the left eye LE of the viewer. Meanwhile, a right eye image is displayed by the plurality of pixels R1, and some of image lights emitted from the plurality of pixels R1 pass through the transmission portions 6 of the barrier part SB where the light-blocking portions 4 are not disposed and subsequently pass through the transmission portions 5 of the barrier part FB where the light-blocking portions 2 are not disposed, thereby entering the right eye RE of the viewer. On the other hand, others of the image lights emitted from the plurality of pixels L1 pass through the transmission portions 6 of the barrier part SB where the light-blocking portions 4 are not disposed and are then blocked by the light-blocking portions 2 of the barrier part FB, thereby being prevented from entering the right eye RE of the viewer. Similarly, others of the image lights emitted from the plurality of pixels R1 pass through the transmission portions 6 of the barrier part SB where the light-blocking portions 4 are not disposed and are then blocked by the light-blocking portions 2 of the barrier part FB, thereby being prevented from entering the left eye LE of the viewer.

As a result, at the normal viewing position shown in FIG. 4, only the left eye image enters the left eye LE of the viewer, and only the right eye image enters the right eye RE of the viewer. In other words, by the barrier part FB having the configuration in which the light-blocking portions 2 are cyclically disposed, the left eye image and the right eye image displayed on the display unit DU are separated from each other, so that the left eye image enters the left eye LE of the viewer and the right eye image enters the right eye RE of the viewer. Thus, the viewer can recognize a stereoscopic image by synthesizing the left eye image which has entered the left eye LE and the right eye image which has entered the right eye RE in the brain. As described above, it is understood that the barrier part FB has a function of separating the left eye image and the right eye image from each other at the normal viewing position at which the left eye image enters the left eye and the right eye image enters the right eye.

Figure 5:
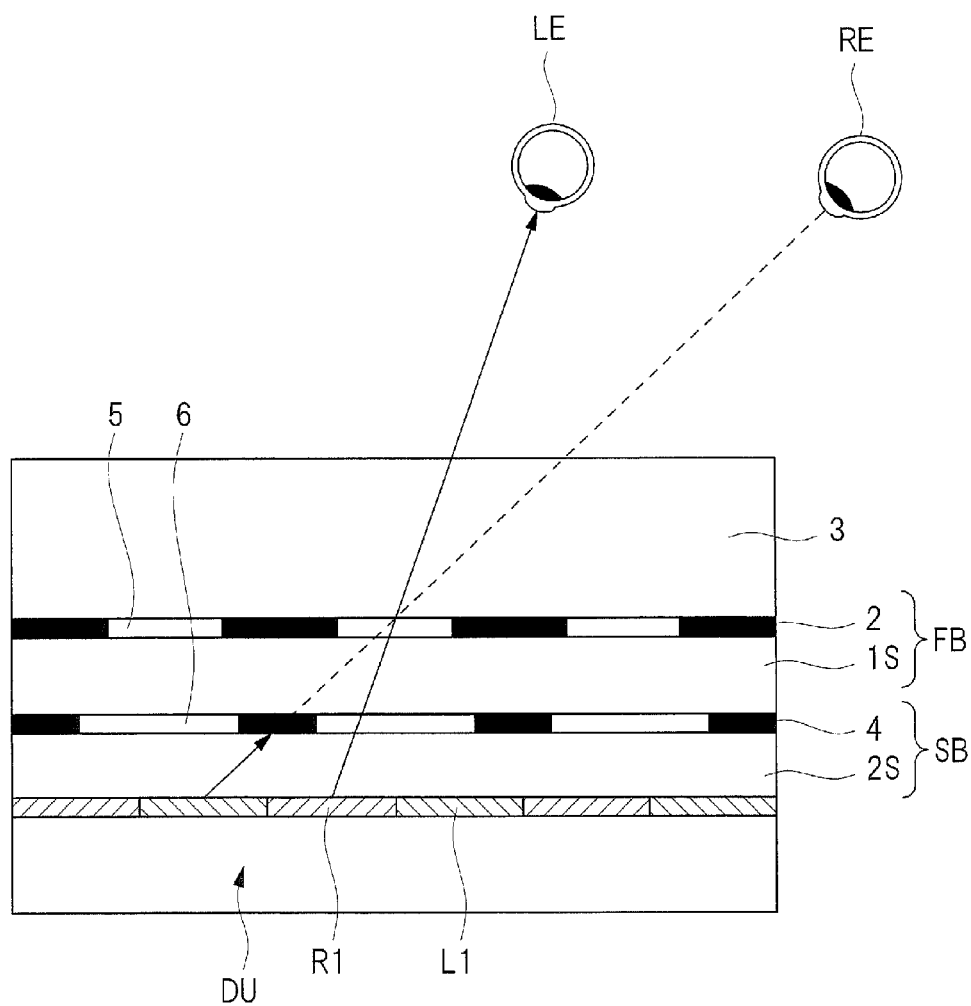
FIG. 5 is a diagram for describing a display operation when a viewer is at a pseudoscopic position which has deviated from the normal viewing position shown in FIG. 4 to the right side.

Next, the case where a viewing position of the viewer deviates from a normal viewing position to a pseudoscopic position will be described with reference to the drawings. FIG. 5 is a diagram for describing a display operation when the viewer is at the pseudoscopic position which has deviated from the normal viewing position shown in FIG. 4 to the right side with respect to a plane of paper.

As shown in FIG. 5, when the viewer is at the pseudoscopic position, some of image lights emitted from the plurality of pixels R1 on which the right eye image is displayed pass through the transmission portions 6 of the barrier part SB and the transmission portions 5 of the barrier part FB and enters the left eye LE of the viewer unlike the case where the viewer is at the normal viewing position. On the other hand, in the first embodiment, image lights emitted toward the right eye RE among image lights emitted from the plurality of pixels L1 on which the left eye image is displayed are blocked by the light-blocking portions 4 constituting the barrier part SB without entering the right eye RE of the viewer.

More specifically, in the first embodiment, by providing the barrier part SB, image lights emitted from the plurality of pixels L1 on which the left eye image is displayed are prevented from entering the right eye RE of the viewer. In other words, in the first embodiment, when the viewer is at the pseudoscopic position, the right eye image enters the left eye LE, but the left eye image is prevented from entering the right eye RE by the light-blocking function of the barrier part SB. Therefore, even when the viewer is at the pseudoscopic position, pseudoscopic perception can be prevented. In this case, since the viewer recognizes only the right eye image which has entered the left eye LE, when the viewer is at the pseudoscopic position, the viewer recognizes that an ordinary two-dimensional image is displayed on the display apparatus in the first embodiment.

As described above, according to the display apparatus in the first embodiment, even when the viewer is at the pseudoscopic position, the pseudoscopic perception can be prevented.

Figure 6:
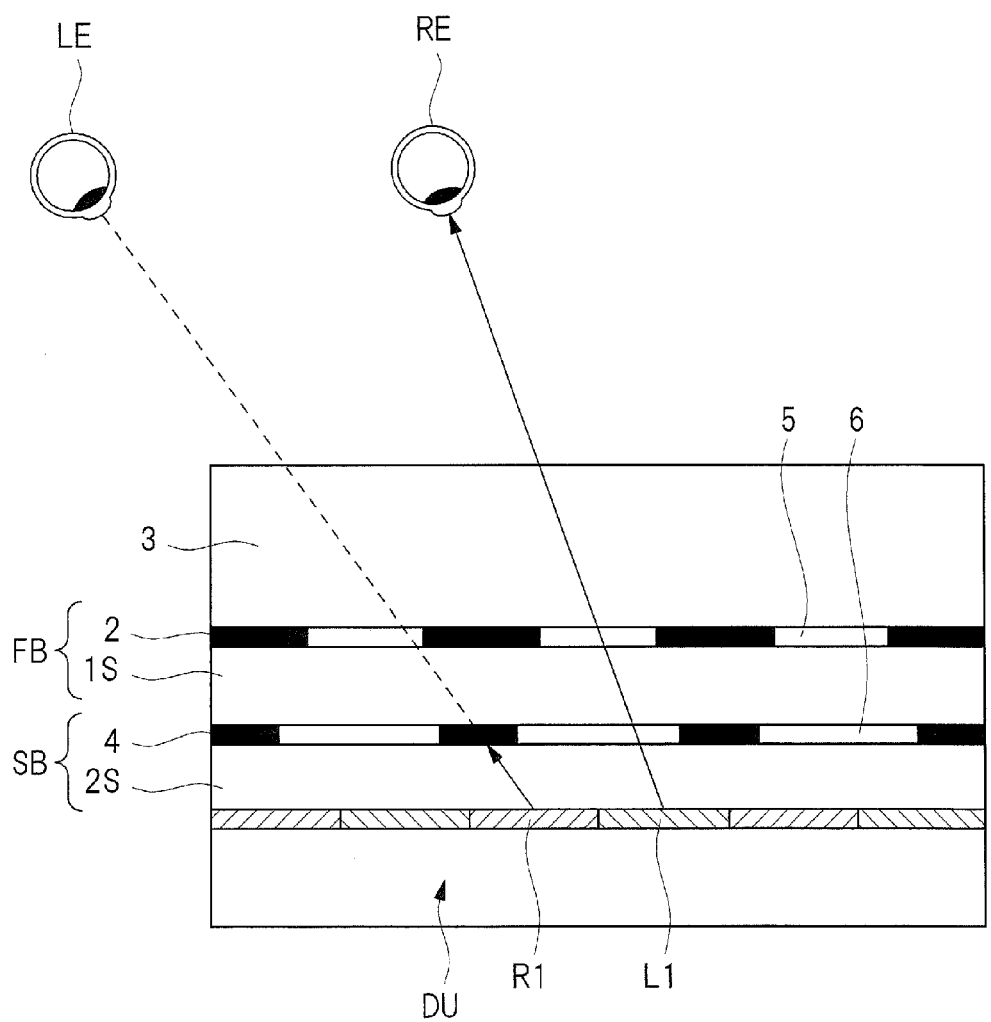
FIG. 6 is a diagram for describing a display operation when a viewer is at a pseudoscopic position which has deviated from the normal viewing position shown in FIG. 4 to the left side.

Next, FIG. 6 is a diagram for describing a display operation when the viewer is at the pseudoscopic position which has deviated from the normal viewing position shown in FIG. 4 to the left side with respect to a plane of paper.

As shown in FIG. 6, when the viewer is at the pseudoscopic position, some of image lights emitted from the plurality of pixels L1 on which the left eye image is displayed pass through the transmission portions 6 of the barrier part SB and the transmission portions 5 of the barrier part FB to enter the right eye RE of the viewer unlike the case where the viewer is at the normal viewing position. On the other hand, in the first embodiment, image lights emitted toward the left eye LE among image lights emitted from the plurality of pixels R1 on which the right eye image is displayed are blocked by the light-blocking portions 4 constituting the barrier part SB without entering the left eye LE of the viewer.

More specifically, in the first embodiment, by providing the barrier part SB, image lights emitted from the plurality of pixels R1 on which the right eye image is displayed are prevented from entering the left eye LE of the viewer. In other words, in the first embodiment, when the viewer is at the pseudoscopic position, the left eye image enters the right eye RE, but the right eye image is prevented from entering the left eye LE by the light-blocking function of the barrier part SB. Therefore, even when the viewer is at the pseudoscopic position, pseudoscopic perception can be prevented. In this case, since the viewer recognizes only the left eye image which has entered the right eye RE, when the viewer is at the pseudoscopic position, the viewer recognizes that an ordinary two-dimensional image is displayed on the display apparatus in the first embodiment.

As described above, according to the display apparatus in the first embodiment, even when the viewer is at the pseudoscopic position, the pseudoscopic perception can be prevented.

From the foregoing, according to the display apparatus in the first embodiment, it is understood that, even when the viewer is at the pseudoscopic position deviated from the normal viewing position to the left side or at the pseudoscopic position deviated from the normal viewing position to the right side, the pseudoscopic perception can be prevented.

<Main Feature of First Embodiment>

As described above, the feature of the first embodiment lies in that the barrier part SB composed of the plurality of light-blocking portions 4 is provided in the display apparatus as shown in FIG. 4 to FIG. 6. According to the first embodiment, when the viewer is at the pseudoscopic position, entrance of the left eye image into the right eye RE or entrance of the right eye image into the left eye LE can be prevented. More specifically, the feature in the first embodiment lies in that the barrier part SB having the function of blocking entrance of the left eye image into the right eye RE or entrance of the right eye image into the left eye LE when the viewer is at the pseudoscopic position is provided. As a result, according to the first embodiment, even when the viewer is at the pseudoscopic position, pseudoscopic perception can be prevented.

The display apparatus in the first embodiment has two kinds of barrier parts, namely, the barrier part FE and the barrier part SB, but the barrier part FB and the barrier part SB are different in function from each other. In the first embodiment, the barrier part FB has a function of separating a left eye image and a right eye image from each other at the normal viewing position at which the left eye image enters the left eye LE and the right eye image enters the right eye RE. More specifically, in the first embodiment, for example, in order to give the above-described function to the barrier part FB, the barrier part FB is composed of the plurality of light-blocking portions 2 cyclically disposed in the predetermined direction at a first pitch. As a result, when the viewer is at the normal viewing position, the viewer can synthesize the left eye image which has entered the left eye LE and the right eye image which has entered the right eye RE in the brain and can recognize a stereoscopic image. Therefore, it is understood that the barrier part FB is required for the viewer to recognize the stereoscopic image at the normal viewing position.

However, only the barrier part FB cannot prevent the pseudoscopic perception from occurring when the viewer is at the pseudoscopic position which has deviated from the normal viewing position. Therefore, in the display apparatus in the first embodiment, the pseudoscopic perception is prevented by providing the barrier part SB in addition to the barrier part FB. In other words, it can be said that the barrier part SB in the first embodiment is provided in order to prevent the pseudoscopic perception when the viewer is at the pseudoscopic position. In the first embodiment, the barrier part SB is composed of, for example, the plurality of light-blocking portions 4 cyclically disposed in the predetermined direction at a second pitch. Thus, when the viewer is at the pseudoscopic position, entrance of the left eye image into the right eye RE or entrance of the right eye image into the left eye LE can be blocked. As a result, according to the first embodiment, even when the viewer is at the pseudoscopic position, the pseudoscopic perception can be prevented.

<Detailed Configuration of Barrier Part>

As described above, in the first embodiment, the plurality of light-blocking portions 2 of the barrier part FB are cyclically disposed in the predetermined direction at the first pitch and the plurality of light-blocking portions 4 of the barrier part SB are cyclically disposed in the predetermined direction at the second pitch. In the configuration of the first embodiment, the first pitch and the second pitch are made different from each other. This point will be specifically described below with reference to the drawings.

Figure 7:
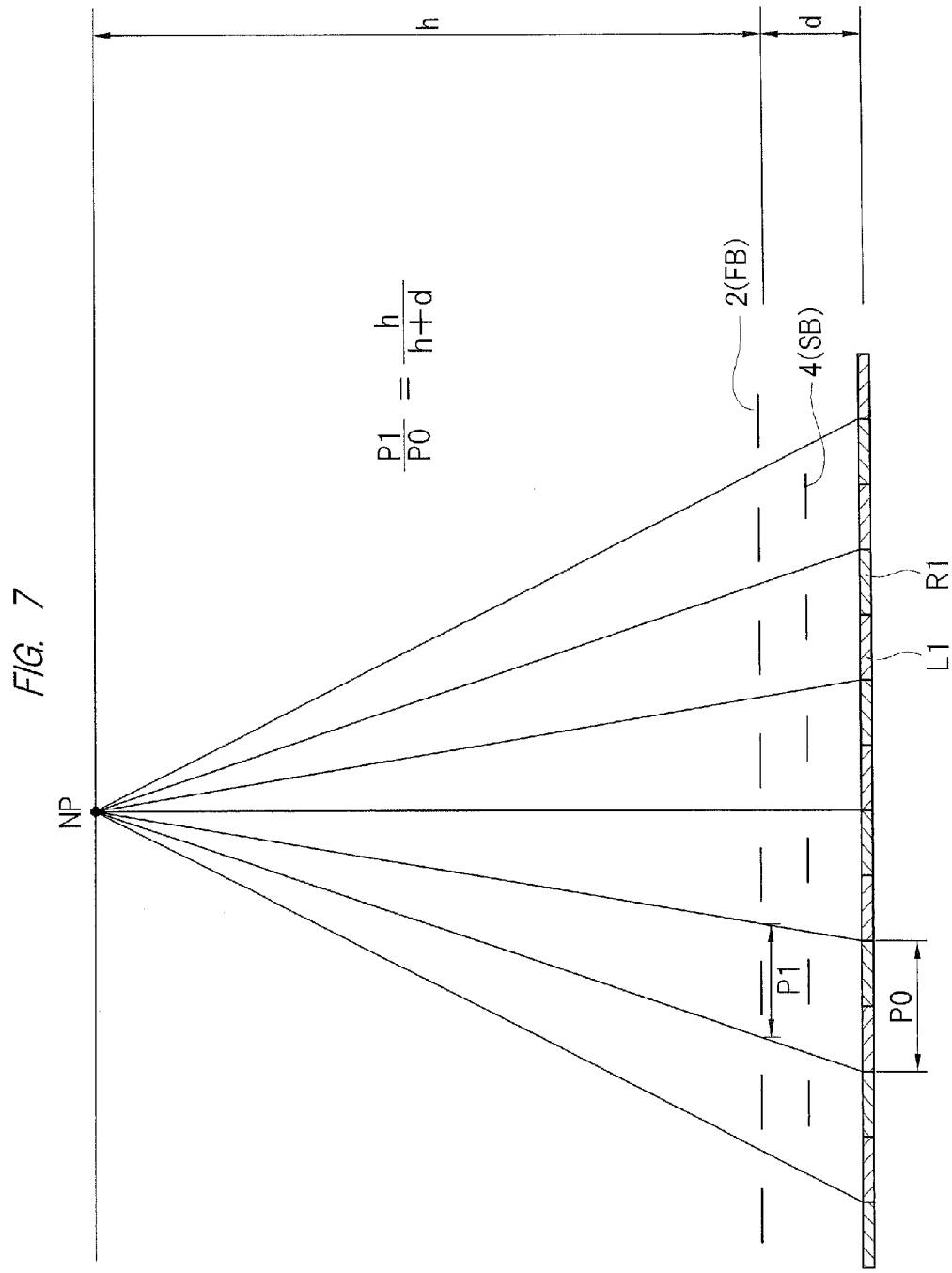
FIG. 7 is a schematic diagram showing a positional relationship between a plurality of light-blocking portions constituting a barrier part and pixels contained in a display unit.

FIG. 7 is a schematic diagram showing a positional relationship between the plurality of light-blocking portions 2 constituting the barrier part FB and the pixels L1 or the pixels R1 included in the display unit DU. In FIG. 7, the plurality of pixels L1 displaying a left eye image and the plurality of pixels R1 displaying a right eye image are cyclically disposed along the predetermined direction which is a lateral direction on a plane of paper of FIG. 7 at the same pitch P0. Here, the lengths of the pixel L1 and the pixel R1 in the predetermined direction are the same, and the sum of the lengths of the pixel L1 and the pixel R1 is defined as the pitch P0. Then, the barrier part SB is formed above the plurality of pixels L1 and the plurality of pixels R1 disposed in this manner, and the barrier part FB is disposed above the barrier part SB. At this time, the barrier part SB has the plurality of light-blocking portions 4 and the plurality of light-blocking portions 4 are cyclically disposed along the above-described predetermined direction. Further, the barrier part FB has the plurality of light-blocking portions 2 and the plurality of light-blocking portions 2 are cyclically disposed along the above-described predetermined direction at the pitch P1. Here, the sum of a distance between the light-blocking portions 2 adjacent to each other and the length of one light-blocking portion 2 is defined as the pitch P1.

As shown in FIG. 7, by drawing an imaginary line from a normal viewing position NP of a viewer, a first triangle whose base is P0 and whose triangle vertex is the normal viewing position NP and a second triangle whose base is P1 and whose triangle vertex is the normal viewing position NP are formed. The first triangle and the second triangle are in a relationship of similarity. Accordingly, as shown in FIG. 7, when a distance from the normal viewing position to the barrier part FB is defined as h and a distance between the barrier part FB and the display unit in which the pixels L1 and the pixels R1 are formed is defined as d, the following relationship of the equation (1) is established.

$$P1/P0 = h/(h+d) \qquad (1)$$

In other words, the pitch P0 at which the plurality of pixels L1 and the plurality of pixels R1 are respectively disposed and the pitch P1 at which the plurality of light-blocking portions 2 are respectively disposed so as to satisfy the equation (1) of P1/P0=h/(h+d). More specifically, the pitch P0 and the pitch P1 are different from each other, and the pitch P1 is smaller than the pitch P0.

Figure 8:
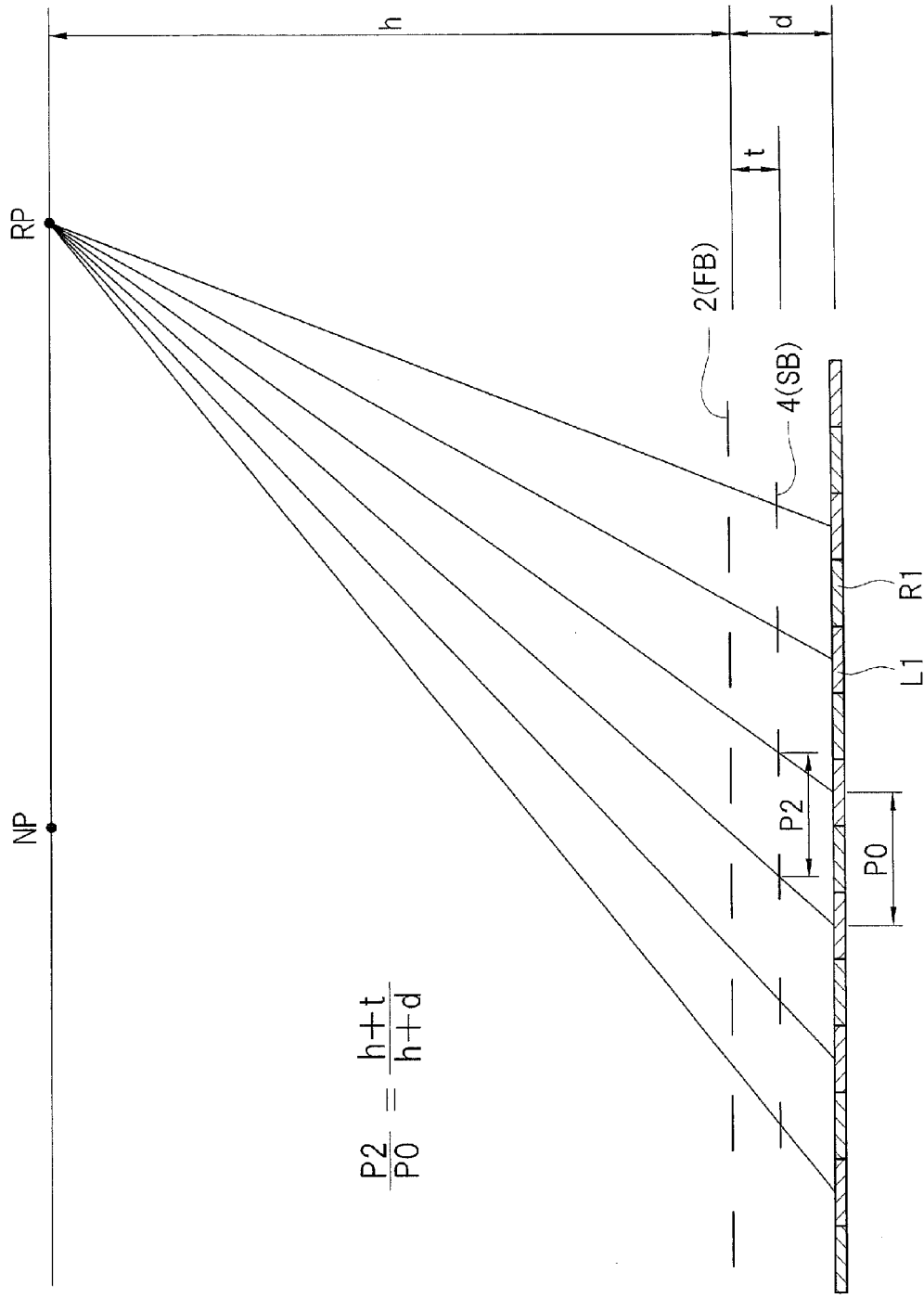
FIG. 8 is a schematic diagram showing a positional relationship between a plurality of light-blocking portions constituting a barrier part and pixels contained in a display unit.

Subsequently, FIG. 8 is a schematic diagram showing a positional relationship between the plurality of light-blocking portions 4 constituting the barrier part SB and the pixels L1 or the pixels R1 contained in the display unit DU. In FIG. 8, the barrier part SB has a plurality of light-blocking portions 4, and the plurality of light-blocking portions 4 are cyclically disposed in the above-described predetermined direction at a pitch P2. Here, the sum of a distance between the light-blocking portions 4 adjacent to each other and the length of one light-blocking portion 4 is defined as the pitch P2. Further, the pseudoscopic position RP is a position at which image light from the pixel L1 toward the right eye of the viewer is blocked by the light-blocking portion 4. Note that, in FIG. 8, the position at which image light from the pixel L1 toward the right eye of the viewer is blocked by the light-blocking portion 4 is defined as the pseudoscopic position RP, but the position at which image light from the pixel R1 toward the left eye of the viewer is blocked by the light-blocking portion 4 which is laterally reversed to the case shown in FIG. 8 is also the pseudoscopic position RP.

As shown in FIG. 8, by drawing an imaginary line from the pseudoscopic position RP of the viewer, a first triangle whose base is P0 and whose triangle vertex is the pseudoscopic position RP and a second triangle whose base is P2 and whose triangle vertex is the pseudoscopic position RP are formed. The first triangle and the second triangle are in a relationship of similarity. Accordingly, for example, as shown in FIG. 8, a distance from the pseudoscopic position to the barrier part FB is defined as h. The "h" is the same as the distance from the normal viewing position to the barrier part FB. Further, when a distance from the barrier part FB to the display unit in which the pixels L1 and the pixels R1 are formed is defined as d and a distance between the barrier part FB and the barrier part SB is defined as t, the following relationship of the equation (2) is established.

$$P2/P0=(h+t)/(h+d) \quad (2)$$

According to the above-described equations 1 and 2, the pitch P0 and the pitch P2 satisfy the relationship of the equation (2) of P2/P0=(h+t)/(h+d). More specifically, the pitch P0 and the pitch P2 are different from each other, and the pitch P2 is smaller than the pitch P0. Further, as is understood with reference to FIG. 7 and FIG. 8, the pitch P1 and the pitch P2 are also different from each other, and the pitch P2 is larger than the pitch P1. In other words, the pitch P1 is smaller than the pitch P2.

Figure 9:
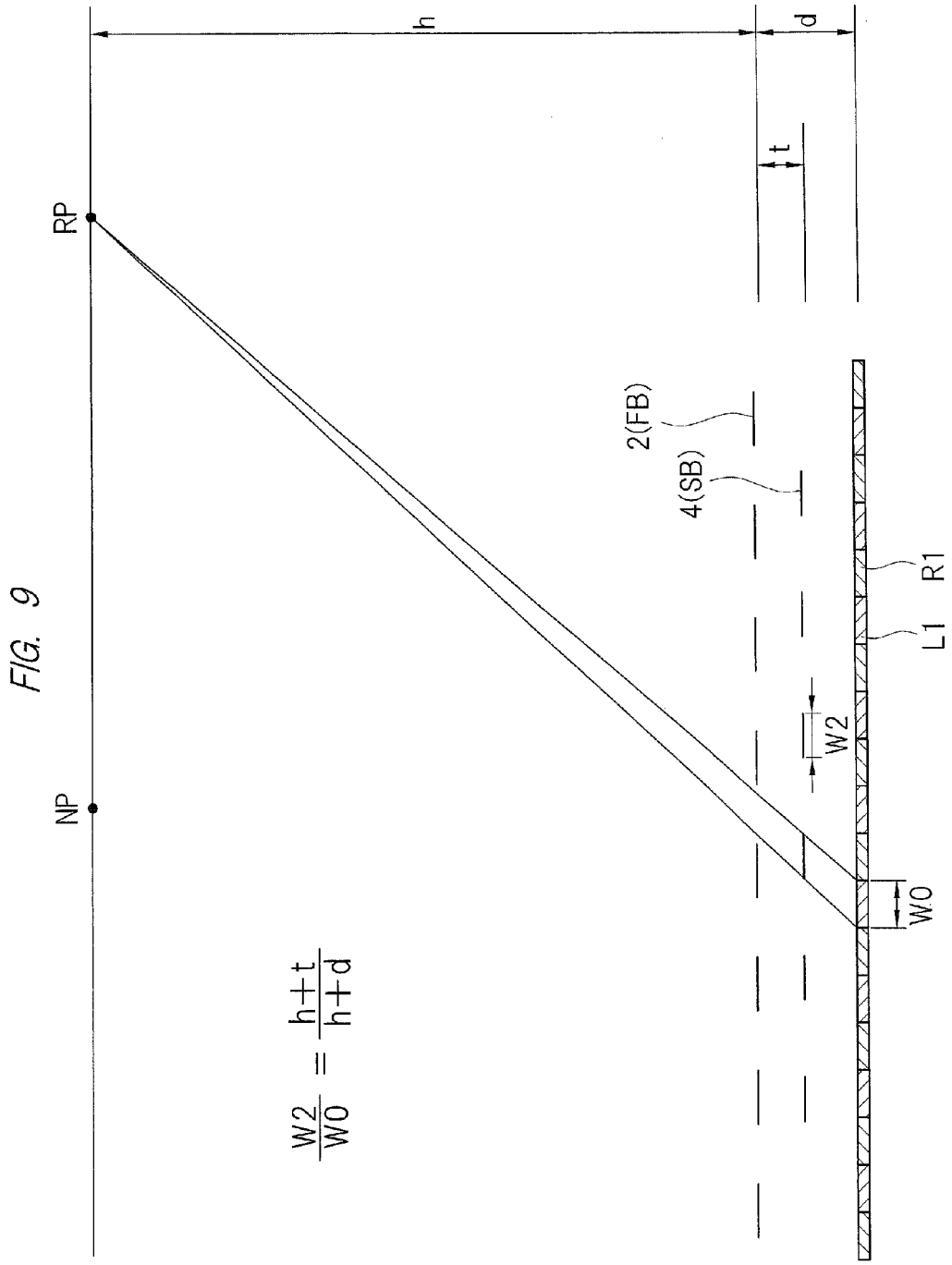
FIG. 9 is a schematic diagram showing a positional relationship between a plurality of light-blocking portions constituting a barrier part and pixels contained in a display unit.

Next, the relationship between the width of the plurality of light-blocking portions 4 constituting the barrier part SB and the width of the pixels L1 and the pixels R1 will be described. FIG. 9 is a schematic diagram showing a positional relationship between the plurality of light-blocking portions 4 constituting the barrier part SB and the pixels L1 or the pixels R1 contained in the display unit DU. In FIG. 9, the width of each of the plurality of pixels L1 for displaying the left eye image and the width of each of the plurality of pixels R1 for displaying the right eye image are the same, and they are defined as width W0. On the other hand, the width of each of the plurality of light-blocking portions 4 constituting the barrier part SB is defined as width W2.

Here, as shown in FIG. 9, by drawing an imaginary line so that light from the pixel L1 is blocked at the pseudoscopic position RP of a viewer, a first triangle whose base is W0 and whose triangle vertex is the pseudoscopic position RP and a second triangle whose base is W2 and whose triangle vertex is the pseudoscopic position RP are formed. The first triangle and the second triangle are in a relationship of similarity. Accordingly, as shown in FIG. 9, the following relationship of the equation (3) is established.

$$W2/W0=(h+t)/(h+d) \quad (3)$$

More specifically, the width W0 of each of the plurality of pixels L1 and the plurality of pixels R1 and the width W2 of each of the plurality of light-blocking portions 4 satisfy the relationship of the equation (3) of W2/W0=(h+t)/(h+d). From the foregoing, the width W0 of each of the plurality of pixels L1 and the plurality of pixels R1 and the width W2 of each of the plurality of light-blocking portions 4 are different from each other, and the width W2 is smaller than the width W0. In other words, the width W0 is larger than the width W2.

The barrier part FB and the barrier part SB in the first embodiment are constituted in the above-described manner. Note that, in the first embodiment, for example, the case where the barrier part SB is disposed above the display unit DU and the barrier part FB is disposed above the barrier part SB as shown in FIG. 3 is described. In other words, in FIG. 3, the case where the barrier part SB is provided between the display unit DU and the barrier part FB in the thickness direction of the display unit DU has been described. However, the technical idea in the first embodiment is not limited to this. For example, the configuration in which the barrier part FB is disposed above the display unit DU and the barrier part SB is disposed above the barrier part FB can also be adopted. In other words, the technical idea in the first embodiment can be applied even when the display apparatus is configured so that the barrier part FB is provided between the display unit DU and the barrier part SB in the thickness direction of the display unit DU.

<Manufacturing Method of Display Apparatus in First Embodiment>

Figure 10:
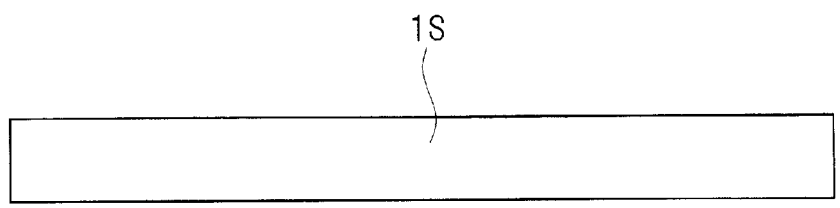
FIG. 10 is a sectional view showing a manufacturing step of a display apparatus in the first embodiment.

A manufacturing method of the display apparatus in the first embodiment will be described below with reference to the drawings. First, as shown in FIG. 10, a base material 1S made of, for example, glass, transparent plastic, transparent film, or the like is prepared.

Here, the term "transparent (transparency)" indicates that translucency to visible light is provided, and it is used as a broad concept including a state where transmission light is generated. More specifically, the transparency in this specification is defined as a state where transmission light is generated regardless of the light amount of the transmission light. Therefore, the state where at least transmission light exists, that is, not only a state where the light amount of transmission light is large but also a semitransparent state where the light amount of transmission light is about half or a state where the light amount of transmission light is small is included in the transparency in this specification. Further, the visible light in this specification indicates electromagnetic wave having a wavelength in a range of about 400 nm to 760 nm.

Figure 11:
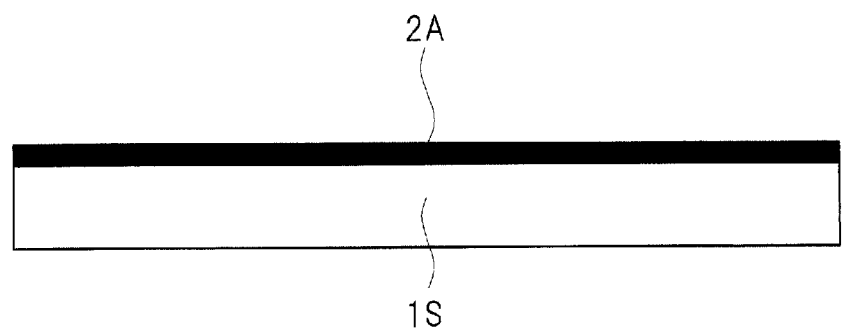
FIG. 11 is a sectional view showing a manufacturing step of the display apparatus in the first embodiment.

Next, a light-blocking film 2A is formed on the base material 1S as shown in FIG. 11. The light-blocking film 2A can be composed of, for example, a metal film containing at least one of chromium, aluminum, and molybdenum or a resin film containing a coloring material. When the light-blocking film 2A is formed of a metal film, for example, it can be formed by using sputtering process, vapor-deposition method, or the like, and when the light-blocking film 2A is formed of a resin film, it can be formed by using a coating method or the like.

Figure 12:
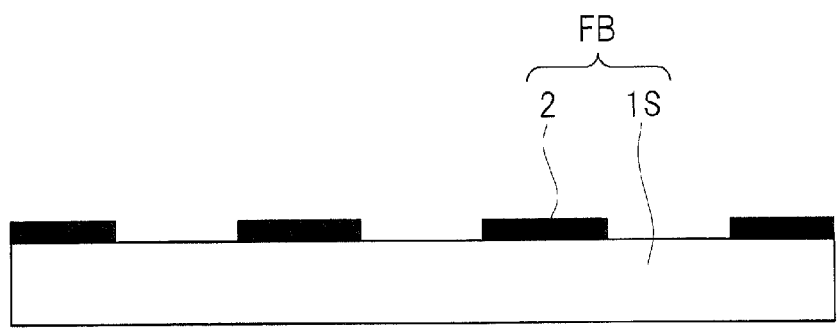
FIG. 12 is a sectional view showing a manufacturing step of the display apparatus in the first embodiment.

Thereafter, as shown in FIG. 12, for example, a plurality of light-blocking portions 2 are formed on the base material 1S by using the photolithography technique and the etching technique. At this time, each of the plurality of light-blocking portions 2 is composed of the light-blocking film 2A. In the above-described manner, the barrier part FB composed of the base material 1S and the plurality of light-blocking portions 2 formed on the base material 1S can be formed.

Figure 13:
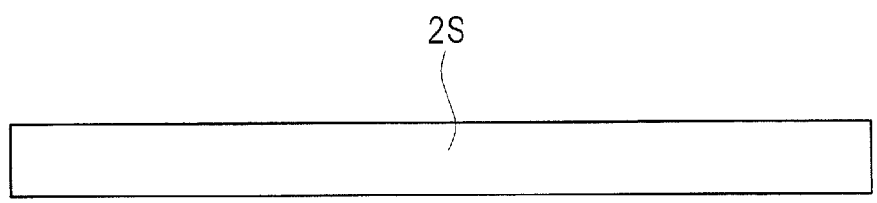
FIG. 13 is a sectional view showing a manufacturing step of the display apparatus in the first embodiment.
Figure 14:
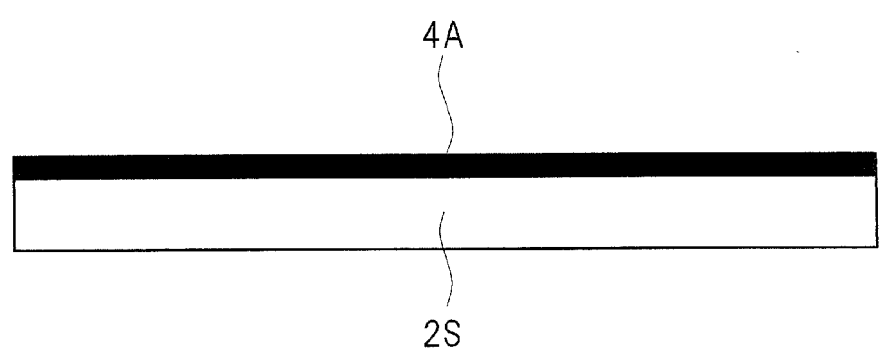
FIG. 14 is a sectional view showing a manufacturing step of the display apparatus in the first embodiment.

Similarly, as shown in FIG. 13, a base material 2S composed of, for example, glass, transparent plastic, transparent film, or the like is prepared. Then, as shown in FIG. 14, a light-blocking film 4A is formed on the base material 2S. The light-blocking film 4A can be composed of, for example, a metal film containing at least one of chromium, aluminum, and molybdenum, or a resin film containing a coloring material. At this time, when the light-blocking film 4A is formed of a metal film, for example, it can be formed by using sputtering process, vapor-deposition method, or the like, and when the light-blocking film 4A is formed of a resin film, it can be formed by using a coating method or the like.

Figure 15:
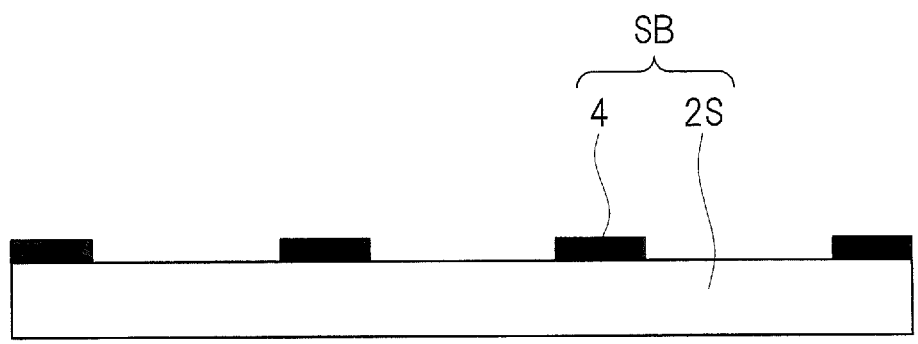
FIG. 15 is a sectional view showing a manufacturing step of the display apparatus in the first embodiment.

Thereafter, as shown in FIG. 15, for example, the light-blocking film 4A formed on the base material 2S is patterned by using, for example, a photolithography technique or an etching technique. Thus, a plurality of light-blocking portions 4 can be formed on the base material 2S. At this time, each of the plurality of light-blocking portions 4 is composed of the light-blocking film 4A. In the above-described manner, the barrier part SB composed of the base material 2S and the plurality of light-blocking portions 4 formed on the base material 2S can be formed.

Figure 16:
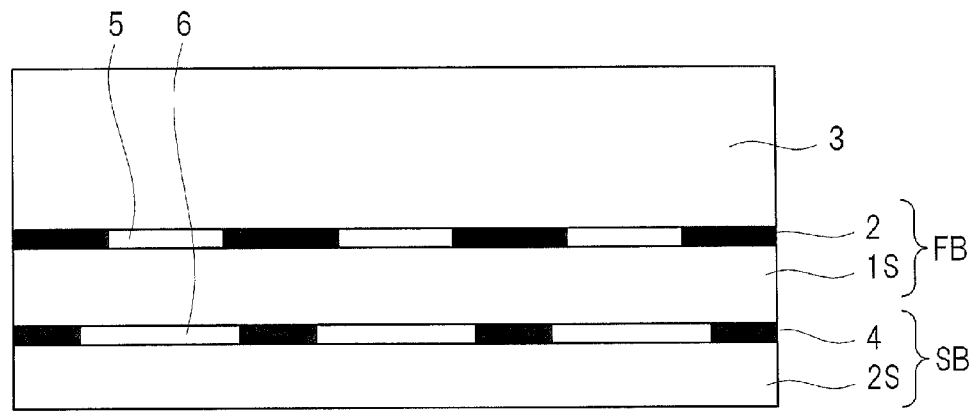
FIG. 16 is a sectional view showing a manufacturing step of the display apparatus in the first embodiment.

Subsequently, as shown in FIG. 16, the barrier part FB and the barrier part SB are attached to each other by using, for example, adhesive agent, and a protection member 3 made of a transparent member is also attached onto the barrier part FB. An optical member having the barrier part FB and the barrier part SB can be manufactured in this manner.

Figure 17:
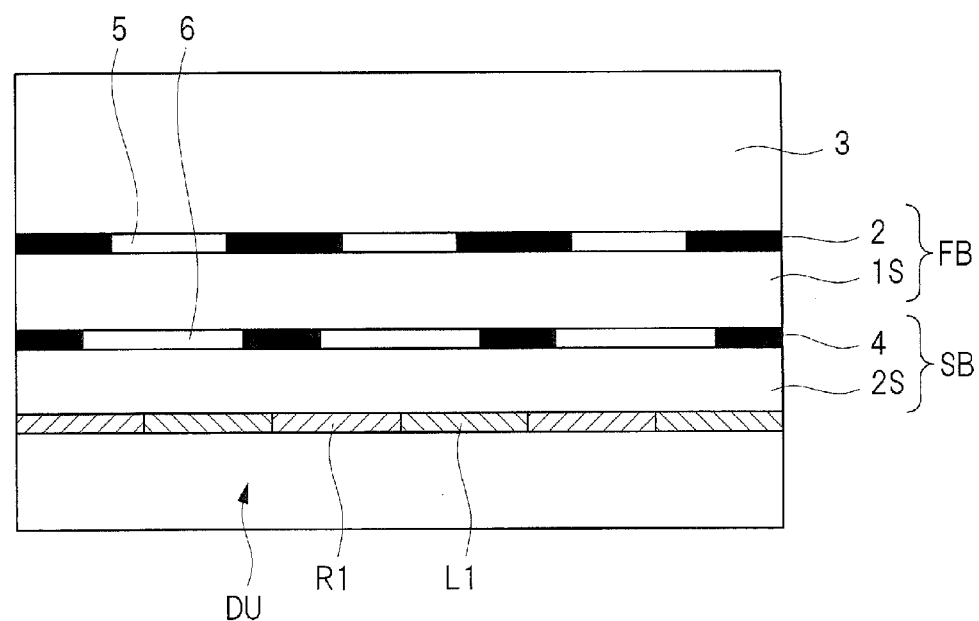
FIG. 17 is a sectional view showing a manufacturing step of the display apparatus in the first embodiment.

Thereafter, as shown in FIG. 17, the optical member is attached onto the display unit DU composed of, for example, a liquid crystal display panel, an organic EL display panel, a plasma display panel, or the like. The display apparatus in the first embodiment can be manufactured in the above-described manner.

<Modified Example>

In the first embodiment, for example, the case where each of the plurality of light-blocking portions 2 constituting the barrier part FE is composed of the light-blocking film 2A made of a metal film or a resin film as shown in FIG. 3 has been described, but the present invention is not limited to this, and the plurality of light-blocking portions 2 may be composed of a lenticular lens. At this time, as the lenticular lens, an optical lens can be used, or a liquid crystal lens utilizing such a fact that the refractive index varies depending on an alignment direction of liquid crystal can be used. Further, the plurality of light-blocking portions 2 may be composed of a liquid crystal switch which controls the transmission and blocking of light in accordance with a mechanism similar to that of the liquid crystal display panel.

Similarly, each of the plurality of light-blocking portions 4 constituting the barrier part SB which is the feature of the first embodiment may also be composed of, for example, a liquid crystal switch which controls the transmission and blocking of light in accordance with a mechanism similar to that of the liquid crystal display panel instead of the light-blocking film composed of a metal film or a resin film.

(Second Embodiment)

In the second embodiment, a case where a liquid crystal display panel is specifically applied as the display unit DU will be described. Note that, in the second embodiment, as the liquid crystal display to be applied as the display unit DU, a transmission type liquid crystal display of a TN system (TN: Twisted Nematic) will be described, but the present invention is not limited to this display panel.

<External Configuration of Liquid Crystal Display Apparatus>

Figure 18:
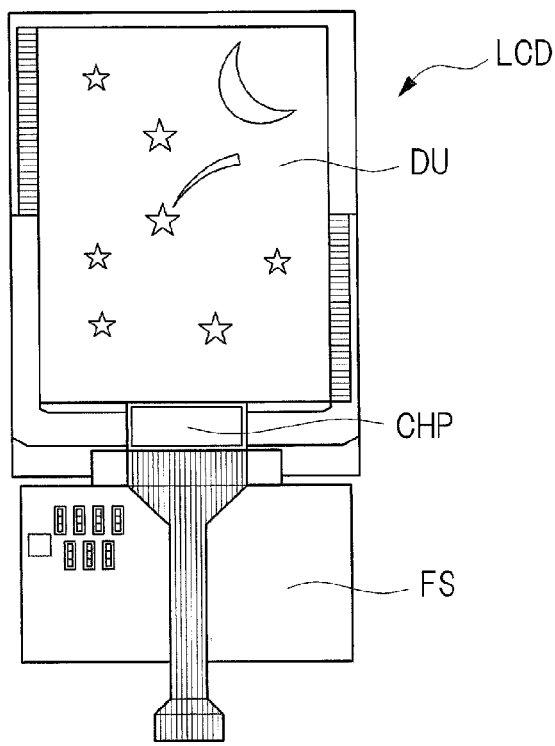
FIG. 18 is a diagram showing one example of an external configuration of a liquid crystal display apparatus.

The liquid crystal display apparatus is widely used as, for example, a display apparatus for a television set or a mobile phone as well as a display apparatus for a personal computer or a word processor. FIG. 18 is a diagram showing one example of an external configuration of a liquid crystal display apparatus LCD. In FIG. 18, the liquid crystal display apparatus LCD has a display unit DU, a semiconductor chip CHP, and a flexible substrate FS. The display unit DU functions as a display unit for displaying an image and is composed of a plurality of liquid crystal display elements. The semiconductor chip CHP is configured to drive the plurality of liquid crystal display elements constituting the display unit DU, and an integrated circuit which performs control so that an image can be displayed on the display unit DU is formed in the semiconductor chip CHP. The semiconductor chip CHP has a function of controlling ON/OFF of the plurality of liquid crystal display elements constituting the display unit DU and is called "LCD driver".

Further, many electronic parts are mounted on the flexible substrate FS, and they are configured to control the liquid crystal display apparatus LCD. Specifically, a semiconductor device in which a CPU and a memory are formed and a plurality of passive elements such as a resistor, a capacitor, and an inductor are mounted on the flexible substrate FS. By the electronic circuit mounted on the flexible substrate FS, for example, the semiconductor chip CHP which is the LCD driver is controlled, and driving control of the display unit DU is performed by the semiconductor chip CHP, so that an image is displayed on the display unit DU. The liquid crystal display apparatus LCD is configured in the above-described manner, and a configuration of the display unit DU will be further described in detail.

<Configuration of Liquid Crystal Display Unit>

Figure 19:
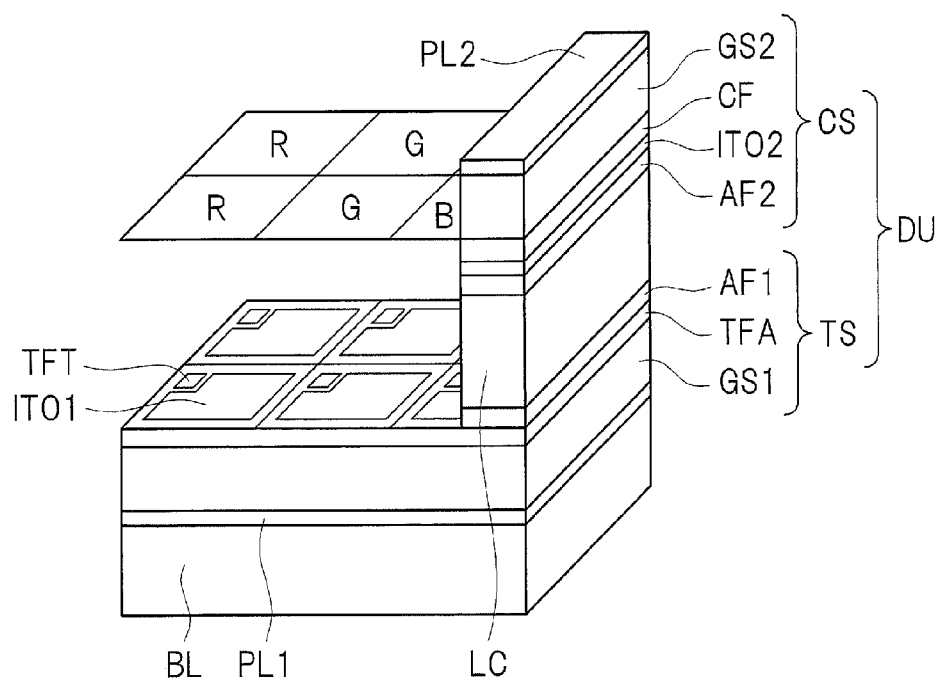
FIG. 19 is a diagram showing a configuration example of the display unit.

FIG. 19 is a diagram showing a configuration example of the display unit DU. As shown in FIG. 19, the display unit DU is composed of a plurality of liquid crystal display elements, and the display unit DU has the configuration as follows. That is, first, the display unit DU has a backlight BL including LEDs (LED: Light Emitting Diode), and a polarization plate PL1 is provided on the backlight BL. Also, a TFT glass substrate TS is disposed on the polarization plate PL1, and a color filter glass substrate CS is disposed above the TFT glass substrate TS via a space. Furthermore, a polarization plate PL2 is disposed on the color filter glass substrate CS, and a spacer (not shown) and a liquid crystal layer LC are provided in a space provided between the TFT glass substrate TS and the color filter glass substrate CS.

The liquid crystal layer LC is sandwiched between the TFT glass substrate TS and the color filter glass substrate CS. The configurations of the TFT glass substrate TS and the color filter glass substrate CS sandwiching the liquid crystal layer LC will be described.

First, the TFT glass substrate TS has a glass substrate GS1 formed on the polarization plate PL1, a TFT array TFA disposed on the glass substrate GS1, and an alignment film AF1 disposed on the TFT array TFA. As the glass substrate GS1, for example, alkali-free glass, silica glass or the like is used. Also, as the substrate on which the TFT array TFA is formed, a plastic substrate, a quartz substrate, or the like can be used instead of the glass substrate.

Subsequently, the TFT array TFA is formed on the glass substrate GS1. The TFT array TFA has a thin film transistor TFT and an ITO electrode ITO1 which are formed for each pixel. Note that, as a switching element for driving the liquid crystal layer LC, for example, another element such as a thin film diode can be used instead of the TFT.

It is necessary to apply a voltage across the liquid crystal layer LC in order to drive the liquid crystal layer LC, and it is necessary to form electrodes on the glass substrate GS1 in order to apply a voltage across the liquid crystal layer LC. Therefore, ITO electrodes ITO1 are formed on the glass substrate GS. In other words, since the ITO electrodes ITO1 are transparent electrodes which allow passage of light, they are used in the display unit DU. The ITO electrode ITO1 is formed by forming a thin film of oxide made of indium and a small amount of tin for reducing resistance and is attached to the glass substrate GS1 on the side in contact with the liquid crystal layer LC. The ITO electrode ITO1 is called "ITO" from initial letters of indium, tin, and oxide, but from a viewpoint of the transparency and good electric conductivity, the electrode can be composed of only tin oxide which is inexpensive. Further, as the transparent electrode, an electrode made of another material such as indium zinc oxide (IZO) may be used instead of the ITO.

As described above, the liquid crystal layer LC is driven by applying a voltage across the liquid crystal layer LC. In other words, the liquid crystal layer LC is driven by utilizing such a fact that liquid crystal molecules stand up straightly by applying a voltage to transparent electrodes (ITO electrodes) formed above and below the liquid crystal layer LC. Therefore, it is desirable to sufficiently accumulate charges in the transparent electrodes in order to make the liquid crystal molecules standup for a necessary time. The thin film transistor TFT is formed from a viewpoint that sufficient charges are accumulated in the transparent electrodes. More specifically, the thin film transistor TFT and the ITO electrode ITO1 are electrically connected to each other, and when the thin film transistor TFT is turned on, current flows into the ITO electrode ITO1 via the turned-on thin film transistor TFT, so that charges are accumulated in the ITO electrode ITO1. Then, by turning off the thin film transistor TFT in this state, charges which have been accumulated in the ITO electrode ITO1 stay in the ITO electrode ITO1 as they are. As a result, charges can be accumulated in the ITO electrode ITO1 for a necessary time, so that the liquid crystal molecules can be made to stand up for the necessary time securely. Therefore, it is understood that the liquid crystal layer LC can be driven sufficiently by providing the thin film transistor TFT.

Note that, in this embodiment, the case where the TN system (TN: Twisted Nematic) is adopted as the driving system of the liquid crystal layer LC has been described, but the present invention is not limited to this as described above. As the driving system of the liquid crystal layer LC of the present invention, a vertical liquid crystal driving system such as a VA (VA: Vertical Alignment) system or a horizontal liquid crystal driving system such as IPS (IPS: In-Plane Switching) system or FFS (FFS: Fringe Field Switching) mode may be used. Further, in this embodiment, the transmissive liquid crystal display apparatus has been described, but a reflective liquid crystal display apparatus may be used instead of the transmissive display apparatus.

Subsequently, an alignment film AF1 is formed on the glass substrate GS1 on which the TFT array TFA has been formed. The alignment film AF1 is formed of, for example, a polyimide film, and it has a function of aligning the directions of liquid crystal molecules. More specifically, the alignment film AF1 can be formed by forming a polyimide film on a surface of the glass substrate GS1 on which the TFT array TFA has been formed and then applying rubbing process to this polyimide film. The term "rubbing" means an operation of rubbing a surface, and when a surface of the polyimide film is rubbed by a roll called "brush" made of nylon or the like, fine scratches are formed on the rubbed surface. In this manner, liquid crystal molecules are aligned in parallel along the fine scratches which have been formed on the surface of the polyimide film. Therefore, the alignment film AF1 is a film obtained by forming fine scratches on the surface of the polyimide film by rubbing process, and it has a function of aligning the directions of liquid crystal molecules. The TFT glass substrate TS is formed in the above-described manner. Further, the alignment film described above is also formed by photo-alignment method, in which the light response of the molecule which has a specific orientation direction by light irradiation is carried out.

Next, the configuration of the color filter glass substrate CS will be described. First, an alignment film AF2 is formed so as to be in contact with the liquid crystal layer LC. The alignment film AF2 is also formed of a polyimide film, and it has a function of aligning the directions of liquid crystal molecules. More specifically, the alignment film AF2 can be formed by forming a polyimide film on a surface of the color filter glass substrate CS in contact with the liquid crystal layer LC and then applying the rubbing process to the polyimide film.

Subsequently, ITO electrodes ITO2 are formed on the alignment film AF2. It is necessary to apply a voltage across the liquid crystal layer LC in order to drive the liquid crystal layer LC, and it is necessary to form transparent electrodes also on the color filter glass substrate CS in order to apply a voltage across the liquid crystal layer LC. Therefore, the ITO electrodes ITO2 are formed on the color filter glass substrate CS. In other words, since the ITO electrodes ITO2 are transparent electrodes which allow passage of light, they are used in the display unit DU. In this manner, the liquid crystal layer LC is sandwiched by the ITO electrodes ITO1 formed on the TFT glass substrate TS and the ITO electrodes ITO2 formed on the color filter glass substrate CS. As a result, it is understood that a voltage can be applied across the liquid crystal layer LC and the liquid crystal layer LC can be driven.

Next, a color filter CF is formed on the ITO electrodes ITO2. For example, by utilizing the color filter CF, information of one color can be represented by three pixels. Specifically, any color can be displayed by applying a small filter corresponding to one of three primary colors to each of three pixels. For example, for displaying a certain color, the color is separated into components of three primary colors of red (R), green (G), and blue (B), brightness of each component is displayed by black and white pixels, and with regard to the black and white display thereof, a red filter is applied to a pixel corresponding to a red component, a green filter is applied to a pixel corresponding to a green component, and a blue filter is applied to a pixel corresponding to a blue component. As a result, these three primary colors are subjected to additive mixture of colors, so that an original color is reproduced. By providing the color filter CF in this manner, colorization of an image to be displayed on the liquid crystal display apparatus LCD can be achieved.

Further, a glass substrate GS2 is disposed on the color filter CF. The color filter glass substrate CS is formed in the above-described manner.

<Operation of Liquid Crystal Display Unit>

The display unit DU in the liquid crystal display apparatus LCD is configured in the above-described manner, and an operation of the display unit DU will be described below with reference to the drawings. Specifically, in the second embodiment, an operation using nematic liquid crystal will be described. The nematic liquid crystal is liquid crystal whose elongated molecules are aligned in a certain direction, and the alignment direction is called "director".

First, as shown in FIG. 19, the liquid crystal layer LC is sandwiched between the TFT glass substrate TS and the color filter glass substrate CS. Then, in a region in contact with the TFT glass substrate TS, the liquid crystal layer LC is put into a state in which liquid crystal molecules are laid in parallel with the TFT glass substrate TS. More specifically, the director of the liquid crystal layer LC is made parallel with the TFT glass substrate TS. On the other hand, also for the color filter glass substrate CS, the liquid crystal layer LC is similarly put into a state in which liquid crystal molecules are laid in parallel with the color filter glass substrate CS. At this time, the direction of the liquid crystal molecules lying above the TFT glass substrate TS and the direction of liquid crystal molecules parallel with the color filter substrate CS under the color filter substrate CS are different by 90°. In this case, the direction of the liquid crystal molecules is gradually twisted in the liquid crystal layer LC as proceeding from the TFT glass substrate TS to the color filter glass substrate CS, so that the direction of the liquid crystal molecules in the region in contact with the TFT glass substrate TS and the direction of the liquid crystal molecules in the region in contact with the color filter glass substrate CS are twisted from each other by 90°.

Figure 20:
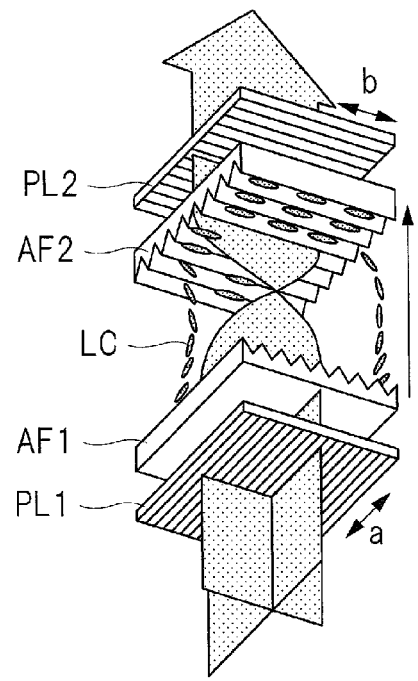
FIG. 20 is a diagram for describing an operation of the display unit.

Based on the above-described configuration, as shown in FIG. 20, the polarization plate PL1 and the polarization plate PL2 are disposed so as to sandwich the liquid crystal layer LC, and the polarization plate PL1 and the polarization plate PL2 are disposed so that a vibration direction ("a" direction) of light passing through the polarization plate PL1 and a vibration direction ("b" direction) of light passing through the polarization plate PL2 are orthogonal to each other. At this time, as shown in FIG. 20, liquid crystal molecules are arranged on the surface of the polarization plate PL1 so that the alignment direction of the liquid crystal molecules is the same as the vibration direction of light which passes through the polarization plate PL1. In other words, the liquid crystal molecules are aligned in the same direction as the vibration direction of the light passing through the polarization plate PL1. Similarly, regarding the polarization plate PL2, the liquid crystal molecules are arranged so that the alignment direction thereof becomes parallel with the vibration direction of light passing through the polarization plate PL2. Here, since the vibration direction of the light passing through the polarization plate PL1 and the vibration direction of the light passing through the polarization plate PL2 are orthogonal to each other, it is considered that light which has entered the polarization plate PL1 from the backlight cannot pass through the polarization plate PL2 unless the liquid crystal layer LC exists.

However, the liquid crystal molecules constituting the liquid crystal layer LC sandwiched between the polarization plate PL1 and the polarization plate PL2 gradually change their directions from the vibration direction of the light passing through the polarization plate PL1 to the vibration direction of the light passing through the polarization plate PL2 between the polarization plate PL1 and the polarization plate PL2. More specifically, the arrangement of the liquid crystal molecules changes by 90° as proceeding from the polarization plate PL1 toward the polarization plate PL2. As a result, when light enters the polarization plate PL1 from the backlight, the polarization light which has passed through the polarization plate PL1 advances along the twisted arrangement of the liquid crystal molecules and reaches the polarization plate PL2 in such a state that the vibration direction of the light has been changed by 90°. At this time, since the vibration direction of light which has reached the polarization plate PL2 has been changed to the same direction as the vibration direction of light passing through the polarization plate PL2 by the twisted arrangement of the liquid crystal molecules, the light passes through the polarization plate PL2. More specifically, when the light enters the polarization plate PL1 from the backlight, the vibration direction thereof is changed by 90° by the liquid crystal molecules, so that the light can pass through the polarization plate PL2.

The property of changing the vibration direction of light in the liquid crystal layer LC in the above-described manner is called "optical rotation". More specifically, in the nematic liquid crystal, by twisting the arrangement of the liquid crystal molecules, light can be made to pass through between the polarization plate PL1 and the polarization plate PL2 orthogonal to each other. When no voltage is applied to the liquid crystal layer LC, light can pass through the liquid crystal layer LC in this manner. Therefore, for example, it can be understood that, when no voltage is applied to the liquid crystal layer LC in the liquid crystal display apparatus, pixels display white.

Figure 21:
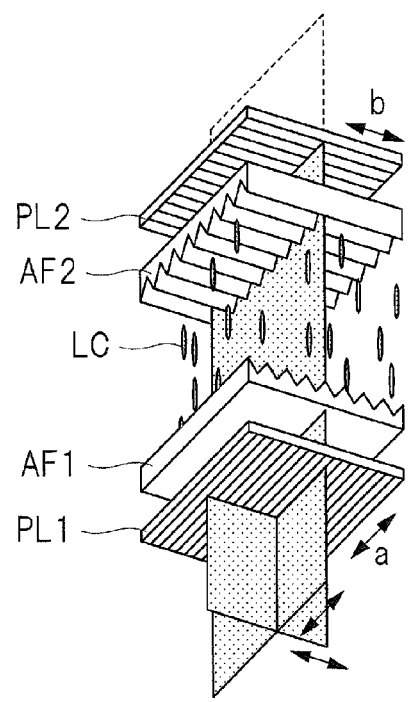
FIG. 21 is a diagram for describing an operation of the display unit.

Subsequently, a case where a voltage is applied to an upper electrode and a lower electrode composed of the ITO electrode ITO1 and the ITO electrode ITO2 sandwiching the liquid crystal layer LC will be considered. In this case, as shown in FIG. 21, the twisted arrangement of the liquid crystal molecules constituting the liquid crystal layer LC is dissolved, so that the liquid crystal molecules stand up straightly to the polarization plate PL1 and the polarization plate PL2. As a result, the optical rotation of the liquid crystal molecules is lost, and even if the light which has passed through the polarization plate PL1 passes through the liquid crystal layer LC, it reaches the polarization plate PL2 without changing its vibration direction. Here, since the vibration direction of the light passing through the polarization plate PL1 and the vibration direction of the light passing through the polarization plate PL2 are orthogonal to each other, the light which has reached the polarization plate PL2 without changing its vibration direction after passing through the polarization plate PL1 cannot pass through the polarization plate PL2. Therefore, it can be understood that the pixels in which a voltage is applied to the upper and lower electrodes sandwiching the liquid crystal layer LC display black. As described above, when no voltage is applied to the upper and lower electrodes sandwiching the liquid crystal layer LC, pixels can display white, and when a voltage is applied to the upper and lower electrodes sandwiching the liquid crystal layer LC, pixels can display black. As a result, by performing the white display or the black display in each of the pixels, an arbitrary character or figure can be displayed on the screen of the display apparatus.

<Application of Present Invention to Liquid Crystal Display Apparatus>

In the following, the naked-eye type display apparatus which makes a viewer recognize a stereoscopic image is configured based on the above-described liquid crystal display apparatus LCD, and the naked-eye type display apparatus capable of preventing the pseudoscopic perception obtained by applying the present invention will be described below.

Figure 22:
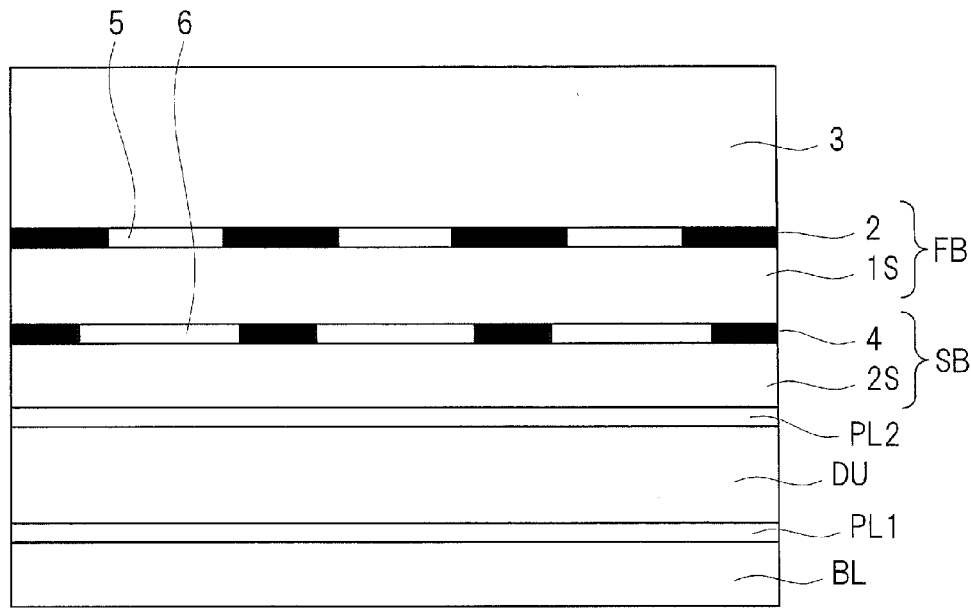
FIG. 22 is a sectional view showing an illustrative configuration of a display apparatus in a second embodiment.

FIG. 22 is a sectional view showing an illustrative configuration of a display apparatus in the second embodiment. In FIG. 22, the display apparatus in the second embodiment has a backlight BL serving as a light source, and a polarization plate PL1 is disposed on the backlight BL. Also, the display unit DU as shown in FIG. 19 is disposed on the polarization plate PL1, and a polarization plate PL2 is disposed on the display unit DU. Further, in the display apparatus in the second embodiment, an optical member is provided on the polarization plate PL2.

Specifically, the optical member has a barrier part SB on the display unit DU. The barrier part SB is configured to have a base material 2S composed of a transparent member such as glass, transparent plastic, or transparent film and a plurality of light-blocking portions 4 formed on a surface of the base material 2S. The plurality of light-blocking portions 4 each have a function of blocking visible light, and they are cyclically disposed in a predetermined direction in FIG. 22, for example, in a direction shown as a lateral direction on a plane of paper in FIG. 22.

Subsequently, as shown in FIG. 22, the optical member has a barrier part FB on the barrier part SB. The barrier part FB is also configured to have a base material 1S composed of a transparent member such as glass, transparent plastic, or transparent film and a plurality of light-blocking portions 2 formed on a surface of the base material 1S. The plurality of light-blocking portions 2 each have a function of blocking visible light, and they are cyclically disposed in the above-described predetermined direction.

Also, a protection member 3 composed of, for example, a transparent member is disposed on the barrier part FB thus configured. In the display apparatus in the second embodiment, the optical member thus configured is disposed on the display unit DU via the polarization plate PL2.

The display apparatus in the second embodiment thus configured also has two kinds of barrier parts, namely, the barrier part FB and the barrier part SB each having different functions like the first embodiment. Specifically, the barrier part FB has a function of separating a left eye image and a right eye image from each other at a normal viewing position at which the left eye image enters a left eye and the right eye image enters a right eye. Thus, when a viewer is at the normal viewing position, the viewer can synthesize the left eye image which has entered the left eye of the viewer and the right eye image which has entered the right eye of the viewer in the brain, so that the viewer can recognize a stereoscopic image.

On the other hand, also in the second embodiment, the barrier part SB has a function of preventing the left eye image from entering the right eye of the viewer or the right eye image from entering the left eye of the viewer when the viewer is at the pseudoscopic position like the first embodiment. As a result, even when the viewer is at the pseudoscopic position, the pseudoscopic perception can be prevented.

Note that, in the second embodiment, as shown in FIG. 22, the case where the optical member having the barrier part FB and the barrier part SB is disposed on the display unit DU via the polarization plate PL2 has been described, but the present invention is not limited to this. For example, even when the optical member having the barrier part FB and the barrier part SB is disposed between the display unit DU and the polarization plate PL2 as shown in FIG. 23, a similar effect can be obtained.

Figure 23:
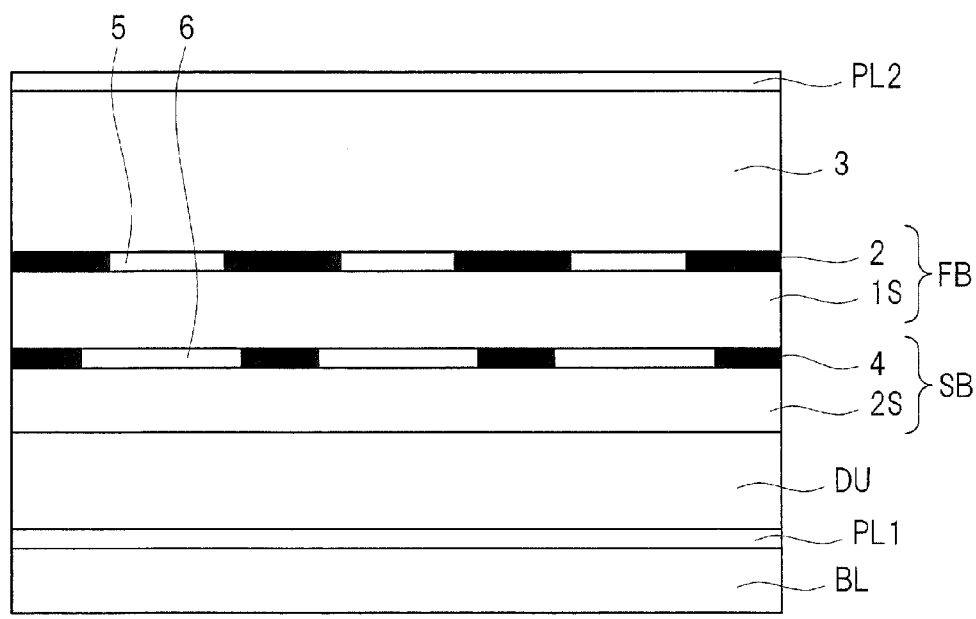
FIG. 23 is a sectional view showing another illustrative configuration of the display apparatus in the second embodiment.

FIG. 23 is a sectional view showing another illustrative configuration of the display apparatus in the second embodiment. In FIG. 23, the display apparatus has a backlight BL serving as a light source, and a polarization plate PL1 is disposed on the backlight BL. Also, the display unit DU as shown in FIG. 19 is disposed on the polarization plate PL1, and an optical member provided with the barrier part SB and the barrier part FB is disposed on the display unit DU. Further, the polarization plate PL2 is disposed on the optical member. More specifically, in another configuration example of the second embodiment, the optical member having the barrier part SB and the barrier part FB is disposed so as to be sandwiched between the display unit DU and the polarization plate PL2 in a thickness direction of the display unit DU. Also in this case, it is possible to make a viewer recognize a stereoscopic image at the normal viewing position, and the pseudoscopic perception at the pseudoscopic position can be prevented effectively.

<Modified Example>

Figure 24:
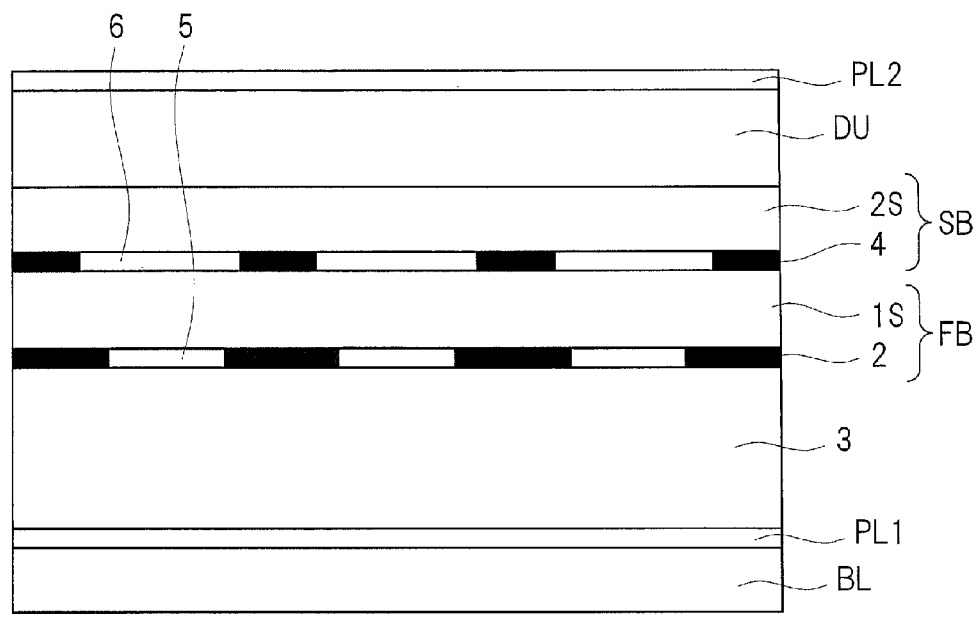
FIG. 24 is a sectional view showing an illustrative configuration of a display apparatus in a modified example.

FIG. 24 is a sectional view showing an illustrative configuration of a display apparatus in a modified example of the second embodiment. In FIG. 24, the display apparatus in the modified example has a backlight BL serving as a light source, and a polarization plate PL1 is disposed on the backlight BL. Also, an optical member is disposed on the polarization plate PL1, and a display unit DU is disposed on the optical member. Further, a polarization plate PL2 is disposed on the display unit DU. More specifically, in the modified example, the optical member is disposed so as to be sandwiched between the backlight BL and the display unit DU via the polarization plate PL1. The optical member has a barrier part FB and a barrier part SB like the second embodiment.

In other words, the display apparatus in the modified example also has two kinds of barrier parts, namely, the barrier part FB and the barrier part SB each having different functions like the second embodiment. Specifically, also in this modified example, the barrier part FB has a function of separating a left eye image and a right eye image from each other at a normal viewing position at which the left eye image enters a left eye and the right eye image enters a right eye. Thus, also in this modified example, when a viewer is at the normal viewing position, the viewer can synthesize the left eye image which has entered the left eye of the viewer and the right eye image which has entered the right eye of the viewer in the brain, so that the viewer can recognize a stereoscopic image.

On the other hand, also in the modified example, the barrier part SB has a function of preventing the left eye image from entering the right eye of the viewer or the right eye image from entering the left eye when the viewer is at the pseudoscopic position. As a result, even when the viewer is at the pseudoscopic position, the pseudoscopic perception can be prevented.

Note that, in the modified example, as shown in FIG. 24, the case where the optical member having the barrier part FB and the barrier part SB is disposed on the backlight BL via the polarization plate PL1 has been described, but the present invention is not limited to this. For example, even when the optical member having the barrier part FB and the barrier part SB is directly disposed on the backlight BL as shown in FIG. 25, a similar effect can be obtained.

Figure 25:
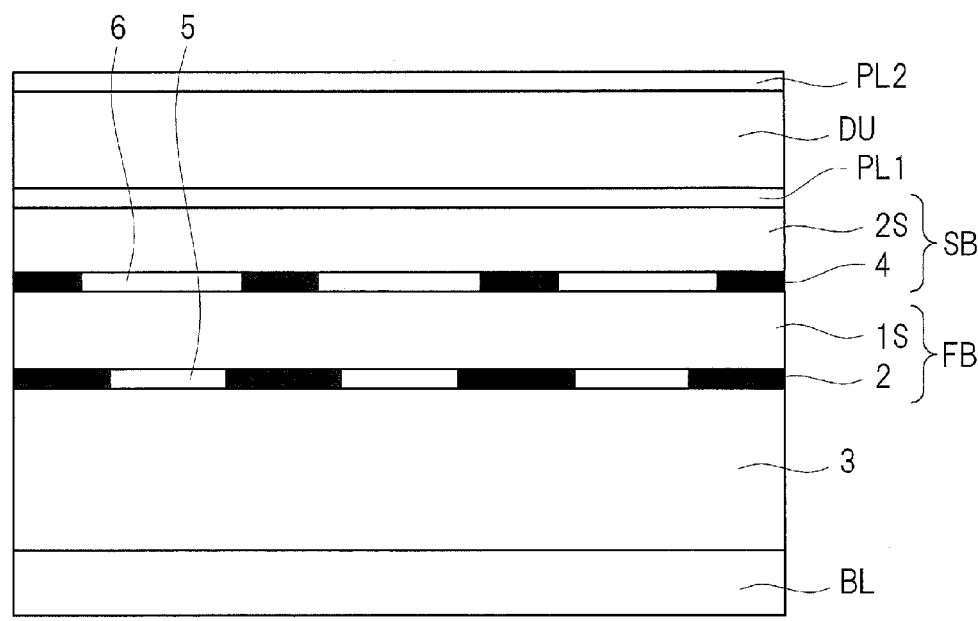
FIG. 25 is a sectional view showing another illustrative configuration of the display apparatus in a modified example.

FIG. 25 is a sectional view showing another illustrative configuration of the display apparatus in the modified example. In FIG. 25, the display apparatus has a backlight BL serving as a light source, and an optical member is disposed on the backlight BL. Also, a polarization plate PL1 is disposed on the optical member, the display unit DU as shown in FIG. 19 is disposed on the polarization plate PL1, and a polarization plate PL2 is disposed on the display unit DU. More specifically, in another configuration example of the modified example, the optical member having the barrier part SB and the barrier part FB is disposed so as to be sandwiched between the backlight BL and the polarization plate PL1 in a thickness direction of the display unit DU. Also in this case, it is possible to make a viewer recognize a stereoscopic image at the normal viewing position, and the pseudoscopic perception at the pseudoscopic position can be prevented effectively.

<Manufacturing Method of Display Apparatus in Second Embodiment>

The display apparatus in the second embodiment is configured in the above-described manner, and a manufacturing method thereof will be briefly described below.

FIG. 26 is a flowchart showing a flow of manufacturing steps for manufacturing the display apparatus in the second embodiment.

First, a TFT glass substrate and a color filter glass substrate are formed. Specifically, a glass substrate is prepared and a thin film transistor is formed on the glass substrate by applying a cleaning technique, a photolithography technique, an etching technique and an ashing technique repeatedly to this glass substrate. In this manner, a TFT glass substrate having the thin film transistor formed on a surface of a glass substrate can be obtained (S101).

Subsequently, an alignment film composed of, for example, a polyimide film is applied on a surface of the TFT glass substrate (S102). Further, the alignment file is also formed by the photo-alignment method, as described above.

Thereafter, rubbing is performed to a surface of the TFT glass substrate on which the alignment film has been formed (S103). By this means, an alignment film having fine scratches aligned in a predetermined direction can be formed on the surface of the TFT glass substrate. Thereafter, a sealing agent is applied to the surface of the TFT glass substrate (S104).

Meanwhile, after another glass substrate is prepared and a black matrix is formed on the glass substrate, a color filter is formed on the glass substrate by using a pigment dispersion method, a staining method, an electrodeposition method, a printing method, or the like. In this manner, a color filter glass substrate having the color filter formed on a surface of the glass substrate can be obtained (S105).

Subsequently, an alignment film composed of, for example, a polyimide film is applied to a surface of the color filter glass substrate (S106). Thereafter, rubbing is performed to the surface of the color filter glass substrate on which the alignment film has been formed (S107). By this means, an alignment film having fine scratches which are aligned in a predetermined direction can be formed on the surface of the color filter glass substrate. Thereafter, a spacer is applied to the surface of the color filter glass substrate (S108).

Next, after the TFT glass substrate to which the sealing agent has been applied and the color filter glass substrate to which the spacer has been applied are attached to each other (S109), scribing (segmenting) is performed to the TFT glass substrate and the color filter glass substrate which have been attached to each other (S110). By this means, the TFT glass substrate and the color filter glass substrate which have been attached to each other are cut to respective pieces corresponding to sizes of individual liquid crystal display apparatuses.

Thereafter, liquid crystal is injected into a gap between the TFT glass substrate and the color filter glass substrate secured by the sealing agent and the spacer (S111). Further, the liquid crystal can be applied between the substrates by one drop fill (ODF) method, instead of being injected. Then, the gap (space) into which the liquid crystal has been injected is sealed (S112).

Subsequently, a pair of polarization plates is attached so as to sandwich the TFT glass substrate and the color filter glass substrate which have been attached to each other (S113). After this step, in the second embodiment, the optical member having the barrier part FB and the barrier part SB formed by the manufacturing method described in the first embodiment is prepared. Then, the optical member is mounted on the polarization plate to be attached thereto (S114). The liquid crystal display panel can be manufactured in this manner. Then, after a driving circuit for driving the liquid crystal display panel is pressure-bonded to the manufactured liquid crystal display panel (S115), a backlight is further attached to the liquid crystal display panel (S116). The liquid crystal display apparatus is completed in this manner (S117). The display apparatus in the second embodiment can be manufactured in the above-described manner.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention can be widely utilized in, for example, a manufacturing industry for manufacturing a naked-eye type display apparatus which makes a viewer recognize a stereoscopic image.

What is claimed is:

1. A display apparatus comprising:
a display unit which displays a left eye image and a right eye image;
a first barrier part which separates the left eye image and the right eye image from each other at a normal viewing position at which the left eye image enters a left eye and the right eye image enters a right eye;
a second barrier part which blocks entering of the left eye image into the right eye or entering of the right eye image into the left eye;
a first polarization plate different from the first barrier part and the second barrier part; and
a second polarization plate different from the first barrier part and the second barrier part,
wherein the display unit, the first barrier part, and the second barrier part are sandwiched between the first polarization plate and the second polarization plate.

2. The display apparatus according to claim 1,
wherein the display unit includes:
a plurality of first pixels for displaying the left eye image; and
a plurality of second pixels for displaying the right eye image, and
the plurality of first pixels and the plurality of second pixels are alternately disposed in a predetermined direction in a display surface.

3. The display apparatus according to claim 2,
wherein the first barrier part has a plurality of first light-blocking portions having a light-blocking function,
the plurality of first light-blocking portions are cyclically disposed in the predetermined direction,
the second barrier part has a plurality of second light-blocking portions having a light-blocking function, and
the plurality of second light-blocking portions are cyclically disposed in the predetermined direction.

4. The display apparatus according to claim 3,
wherein a first pitch at which the plurality of first light-blocking portions are disposed in the predetermined direction and a second pitch at which the plurality of second light-blocking portions are disposed in the predetermined direction are different from each other.

5. The display apparatus according to claim 4,
wherein the first barrier part is provided on a light-emitting side where light is emitted from the display unit.

6. The display apparatus according to claim 5,
wherein the second barrier part is provided between the display unit and the first barrier part in a thickness direction of the display unit,
a pitch at which the plurality of first pixels are disposed in the predetermined direction and a pitch at which the plurality of second pixels are disposed in the predetermined direction are equal to each other, and when the pitches are defined as P0, the first pitch at which the plurality of first light-blocking portions are disposed in the predetermined direction is defined as P1, the second pitch at which the plurality of second light-blocking portions are disposed in the predetermined direction is defined as P2, a distance from the normal viewing position to the first barrier part is defined as h, a distance between the display unit and the first barrier part is defined as d, and a distance between the first barrier part and the second barrier part is defined as t, a relationship of P1/P0=h/(h+d) and a relationship of P2/P0=(h+t)/(h+d) are satisfied.

7. The display apparatus according to claim 6, wherein a width of each of the plurality of first pixels in the predetermined direction and a width of each of the plurality of second pixels in the predetermined direction are equal to each other, and when the widths are defined as W0 and a width of each of the plurality of second light-blocking portions constituting the second barrier part in the predetermined direction is defined as W2, a relationship of W2/W0=(h+t)/(h+d) is satisfied.

8. The display apparatus according to claim 4, further comprising:

a backlight disposed on an opposite side to the light-emitting side where light is emitted from the display unit, wherein the first barrier part and the second barrier part are provided between the display unit and the backlight.

9. The display apparatus according to claim 3, wherein each of the plurality of second light-blocking portions is composed of a light-blocking film.

10. The display apparatus according to claim 9, wherein the light-blocking film is a metal film or a resin film.

11. The display apparatus according to claim 10, wherein the metal film comprises at least one of chromium, aluminum, and molybdenum.

12. The display apparatus according to claim 1, wherein the display unit is a constituent element of a liquid crystal display panel.

13. The display apparatus according to claim 12, wherein the liquid crystal display panel includes:

a first substrate having a thin film transistor formed thereon;

a second substrate having a color filter formed thereon; and a liquid crystal layer sandwiched between the first substrate and the second substrate.

* * * * *